United States Patent
Frederick et al.

(10) Patent No.: US 12,160,421 B2
(45) Date of Patent: Dec. 3, 2024

(54) MULTI-LEGGED NETWORK ATTRIBUTION USING TRACKING TOKENS AND ATTRIBUTION STACK

(71) Applicant: eBay Inc., San Jose, CA (US)

(72) Inventors: Gail Anna Rahn Frederick, Portland, OR (US); Tatjana Vlahovic, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/418,524

(22) Filed: Jan. 22, 2024

(65) Prior Publication Data
US 2024/0163281 A1    May 16, 2024

Related U.S. Application Data

(63) Continuation of application No. 18/205,039, filed on Jun. 2, 2023, now Pat. No. 11,916,898, which is a continuation of application No. 16/517,004, filed on Jul. 19, 2019, now Pat. No. 11,750,598.

(51) Int. Cl.
*H04L 9/40* (2022.01)
*G06Q 20/40* (2012.01)

(52) U.S. Cl.
CPC ....... *H04L 63/0853* (2013.01); *G06Q 20/401* (2013.01)

(58) Field of Classification Search
CPC ............. G06Q 20/401; G06Q 30/0207; H04L 63/0853; H04L 67/02; H04L 9/3213; H04L 9/3234
See application file for complete search history.

(56) References Cited

U.S. PATENT DOCUMENTS

| 9,077,707 B2 | 7/2015 | Vrancken et al. |
| 9,338,007 B1 | 5/2016 | Doshi |

(Continued)

FOREIGN PATENT DOCUMENTS

| CN | 101188577 A | 5/2008 |
| CN | 101473340 A | 7/2009 |

(Continued)

OTHER PUBLICATIONS

European Search Report and Search Opinion received for European Application No. 20185113.6, mailed on Oct. 8, 2020, 9 pages.

(Continued)

*Primary Examiner* — Theodore C Parsons
(74) *Attorney, Agent, or Firm* — Shook, Hardy & Bacon L.L.P.

(57) ABSTRACT

Technologies are shown for network attribution tracking for a multi-legged transaction. In accordance with some aspects, a request is received at a second service from a client device via a first redirect including a first token associated with a first service. The second service sends, to a token service, a token request including the first token, wherein the token request causes the token service to associate a second token with the first token. The second service receives, from the token service, a token response including the second token. The second service provides, to the client device, a second redirect to a third service, the second redirect including the second token. In some aspects, a transaction is attributed to at least the first service and the second service based on the association of the second token with the first token.

20 Claims, 14 Drawing Sheets

(56) References Cited

U.S. PATENT DOCUMENTS

| | | | |
|---|---|---|---|
| 9,626,137 | B2 | 4/2017 | Mihara |
| 9,819,672 | B1 | 11/2017 | Machani |
| 10,509,898 | B2 | 12/2019 | Csinger et al. |
| 11,057,778 | B2 | 7/2021 | Frederick et al. |
| 11,553,352 | B2 | 1/2023 | Frederick et al. |
| 11,750,598 | B2 | 9/2023 | Frederick et al. |
| 11,758,406 | B2 | 9/2023 | Frederick et al. |
| 2005/0015591 | A1 | 1/2005 | Thrash et al. |
| 2007/0244746 | A1* | 10/2007 | Issen .............. H04L 67/306 709/224 |
| 2008/0262920 | A1* | 10/2008 | O'Neill ........... G06Q 30/02 705/26.1 |
| 2009/0171754 | A1 | 7/2009 | Kane et al. |
| 2011/0041168 | A1 | 2/2011 | Murray et al. |
| 2012/0331536 | A1 | 12/2012 | Chabbewal et al. |
| 2013/0086645 | A1 | 4/2013 | Srinivasan et al. |
| 2013/0110675 | A1 | 5/2013 | Bouw |
| 2013/0144755 | A1 | 6/2013 | Mowatt et al. |
| 2013/0325579 | A1 | 12/2013 | Salmon et al. |
| 2015/0254656 | A1 | 9/2015 | Bondesen et al. |
| 2015/0339703 | A1 | 11/2015 | Karlin et al. |
| 2017/0331791 | A1* | 11/2017 | Wardell .............. H04W 12/062 |
| 2018/0020005 | A1 | 1/2018 | Beiter et al. |
| 2019/0087560 | A1 | 3/2019 | Taveau et al. |
| 2020/0250694 | A1* | 8/2020 | Mock .............. G06Q 20/40 |
| 2020/0280846 | A1 | 9/2020 | Frederick et al. |
| 2020/0314087 | A1 | 10/2020 | Zeck et al. |
| 2021/0021591 | A1 | 1/2021 | Frederick et al. |
| 2021/0289363 | A1 | 9/2021 | Frederick et al. |
| 2023/0052525 | A1 | 2/2023 | Frederick et al. |
| 2023/0353558 | A1 | 11/2023 | Frederick et al. |
| 2023/0370852 | A1 | 11/2023 | Frederick et al. |

FOREIGN PATENT DOCUMENTS

| | | |
|---|---|---|
| CN | 102611709 A | 7/2012 |
| CN | 102724647 A | 10/2012 |
| CN | 104144416 A | 11/2014 |
| CN | 104255007 A | 12/2014 |
| CN | 104641345 A | 5/2015 |
| WO | 2017/004373 A1 | 1/2017 |
| WO | 2020/176138 A1 | 9/2020 |

OTHER PUBLICATIONS

International Preliminary Report on Patentability received for PCT Patent Application No. PCT/US2019/053805, mailed on Sep. 10, 2021, 11 pages.

International Search Report and Written Opinion received for PCT Patent Application No. PCT/US2019/053805, mailed on Dec. 13, 2019, 14 pages.

Fotiou et al., "Access control delegation for the cloud," 2014 IEEE Conference on Computer Communications Workshops (Infocom Wkshps), Toronto, ON, Canada, 2014, pp. 13-18, doi: 10.1109/INFCOMW.2014.6849161. (Year: 2014).

Heo et al., "How to divide a permission token in the delegation process of blockchain-based access control for IoT," 2022 IEEE International Systems Conference (SysCon), Montreal, QC, Canada, 2022, pp. 1-8, doi: 10.1109/SysCon53536.2022.9773848. (Year: 2022).

Ince et al., "Token-based authentication and access delegation for HW-accelerated telco cloud solution," 2022 IEEE 11th International Conference on Cloud Networking (CloudNet), Paris, France, 2022, pp. 109-117, doi: 10.1109/CloudNet55617.2022.9978865. (Year: 2022).

Notice of Allowance received for U.S. Appl. No. 18/227,623, mailed on Jun. 10, 2024, 16 pages.

Brady, "Delegation Patterns for OAuth 2.0", Retrieved from the Internet URL: <https://www.scottbrady91.com/0Auth/Delegation-Patterns-for-OAuth-20>, Sep. 27, 2018, 6 pages.

Claeys et al., "Securing Complex IoT Platforms with Token Based Access Control and Authenticated Key Establishment", International Workshop on Secure Internet of Things (SIoT), Oslo, Norway, doi: 10.1109/SIoT.2017.00006., 2017, pp. 1-9.

Fotiou et al., "Capability-based access control for multi-tenant systems using OAuth 2.0 and Verifiable Credentials", International Conference on Computer Communications and Networks (ICCCN), Athens, Greece, 10.1109/ICCCN52240.2021.9522214, 2021, 9 pages.

Hardt, "The OAuth 2.0 Authorization Framework", Oct. 31, 2012, pp. 1-76.

Jones et al., "OAuth 2.0 Token Exchange" OAuth Working Group, Retrieved from Internet URL: https://tools.ietf.org/html/draft-ietf-oauth-token-exchange-16, Oct. 19, 2018, 1-34 pages.

Pai et al., "Formal Verification of OAuth 2.0 Using Alloy Framework", International Conference on Communication Systems and Network Technologies, Katra, India, doi: 10.1109/CSNT.2011.141, 2011, pp. 655-659.

Riabi et al., "Blockchain based OAuth for IoT", 10th IFIP International Conference on Performance Evaluation and Modeling in Wireless and Wired Networks (PEMWN), Ottawa, ON, Canada, doi: 10.23919/PEMWN53042.2021.9664701., 2021, 7 pages.

Tanvi et al., "Token Based Authentication Using Mobile Phone", International Conference on Communication Systems and Network Technologies, Katra, India, doi: 10.1109/CSNT.2011.24., 2011, pp. 85-88.

\* cited by examiner

MULTI-LEGGED NETWORK ATTRIBUTION USING TRACKING TOKENS AND ATTRIBUTION STACK

CROSS-REFERENCE TO RELATED APPLICATIONS

This application is a continuation of U.S. patent application Ser. No. 18/205,039, filed Jun. 2, 2023, which is a continuation of U.S. patent application Ser. No. 16/517,004, filed Jul. 19, 2019 (issued as U.S. Pat. No. 11,750,598). Each of the aforementioned is herein incorporated by reference in its entirety for all purposes.

BACKGROUND

Online content partners often pull selections of information from a content service using the content service's APIs. Examples of information pulled from a content service in this manner can include text, audio or video content from a content provider, advertising from an advertising service, or inventory from an online marketplace. A partner service or partner's service, e.g. a service provided by a partner entity, may curate the information of their choice and surface it in their own experiences. Successful transactions, such as a user access of content, a user click through on an advertisement or a purchase, are typically attributed to the partner service involved with the transaction.

Some of the partner services can further share the content service's inventory with their partners who also have contractual agreements with the content service. When a transaction is completed by a user who originated on the interface experience of a partner service, then it is desirable for both entities to receive attribution for the traffic, such as credit for a transaction or a New or Repeat Buyer (NORB).

For example, many of the advertisements in an eCommerce platform, such as an online marketplace, can be provided from a partner website that is tailored to a particular demographic group, such as millennials or students. When a user of the online marketplace clicks through an advertisement from the partner website, the navigation flow redirects to the partner website. When the user executes a transaction on the partner website, the transaction is handled by an API of the online marketplace service, e.g. a buy API, with the partner website being the transaction partner of record. Both the transaction and the NORB are attributed to the partner website even though the user originated on the online marketplace. Both the online marketplace and the partner website are attributable for the traffic from the user. However, at present, there does not appear to be an efficient way to track attribution in complex transactions.

It is with respect to these and other considerations that the disclosure made herein is presented.

SUMMARY

The disclosed technology is directed toward tracking attribution in multi-legged network transactions. In general terms, some aspects of the disclosed technology utilize tracking tokens and an attribution stack that are managed by a tracking service.

In some examples, a partner service receives a redirect that includes a tracking token and sends a registration request to the tracking service with the tracking token received in the redirect. The tracking service uses the tracking token in the registration request to identify the attribution stack for the transaction. The tracking service generates a new tracking token, enters the new tracking token in the attribution stack in association with the partner service, and returns the new tracking token to the partner service.

The partner service receives the new tracking token and includes it in another redirect to a next partner service. The next partner service repeats the process of registering with the tracking service. This process can be repeated indefinitely for redirects in a transaction flow with each registration leading to another entry in the attribution stack. When the transaction completes, the disclosed technology enables each entity in the attribution stack to be identified for attribution.

In certain examples of the disclosed technologies, methods, systems or computer readable media for network attribution tracking for multi-legged transactions involving receiving a first token request from a first partner service and, in response to the first token request, generating a first tracking token, associating the first tracking token to the first partner in an attribution stack, sending a response to the first token request that includes the first tracking token.

These examples also involve receiving a second token request from the first partner service to a second partner service, the second redirection including the first tracking token and, in response to the second token request, generating a second tracking token, associating the second tracking token to the second partner service in the attribution stack, and sending a response to the second redirection that includes the second tracking token.

These examples also involve receiving a third token request from a third partner service, the third token request including the second token and, in response to the third token request, generating a third tracking token, associating the third tracking token to the third partner service in the attribution stack, and sending a response to the third redirection that includes the third tracking token.

These examples further involve receiving a transaction request from the third partner service, the transaction request including the third tracking token, and attributing the transaction to the first, second and third partner services based on the attribution stack. Examples of transactions for which attribution can be tracked include a data transaction or a purchase transaction.

Examples in accordance with certain aspects of the disclosed technology can further include receiving a redirection from a client and, responsive to the redirection, sending the first token request to a tracking service, receiving a response from the tracking service with the first tracking token and redirecting to the second partner with the first tracking token.

Certain examples involve receiving a redirection from the first partner with the first tracking token and, responsive to the redirection from the first partner, sending the second token request to the tracking service with the first tracking token. These examples further involve receiving a response from the tracking service with the second tracking token and redirecting to the third partner with the second tracking token.

Certain other examples involve receiving a redirection from the second partner with the second tracking token and, responsive to the redirection from the first partner, sending the second token request to the tracking service with the second tracking token, receiving a response from the tracking service with the third tracking token, and, responsive to a transaction request from the client, sending one of a transaction request and an attribution request to the tracking service with the third tracking token.

In yet another example, the function of attributing the transaction to the first, second and third partner services based on the attribution stack involves receiving a request for attribution for the transaction, accumulating attribution entities from each entry of attribution stack for the transaction, and attributing the transaction to the accumulated attribution entities.

In certain other examples, the first tracking token comprises a first composite tracking token that identifies the first partner, the second tracking token comprises a second composite tracking token that identifies the first partner and the second partner, and the third tracking token comprises a third composite tracking token that identifies the second partner and the third partner.

Different examples of attribution tracking for multi-legged transactions involve receiving a tracking token registration request from a partner service, generating a tracking token associated with the partner service, adding an entry to an attribution stack for a transaction, where the entry associates the tracking token with the partner service, and returning the tracking token to the partner service.

In certain of these examples, the function of receiving a tracking token request from a partner service involves determining whether the tracking token request includes a previously generated tracking token and using the previously generated tracking token to identify the attribution stack for the transaction. In these examples, the function of adding an entry to an attribution stack for a transaction involves adding the entry to the attribution stack identified for the transaction.

In particular examples, the function of generating a tracking token associated with the partner service involves combining the previously generated tracking token in the generated tracking token to create a composite tracking token.

In other particular examples, the function of adding an entry to an attribution stack for a transaction involves adding the entry to the attribution stack in an order corresponding to when the token registration request for the entry is received.

Some examples further involve receiving an attribution request for the transaction, where the attribution request includes a tracking token, identifying an attribution stack for the transaction using the tracking token included in the attribution request, accumulating attribution entities from each entry in the attribution stack identified for the transaction, and attributing the transaction to the accumulated attribution entities. These examples can also involve sending an attribution request for the transaction when the transaction is completed.

Additional examples involve receiving a redirection from a previous partner service with the previously generated tracking token, sending the registration request to the tracking service with the previously generated tracking token, receiving a response from the tracking service with the tracking token associated with the partner service the received the redirection, and, responsive to a redirection request to a next partner service, redirecting to the next partner service and including the tracking token received from the tracking service.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1A:
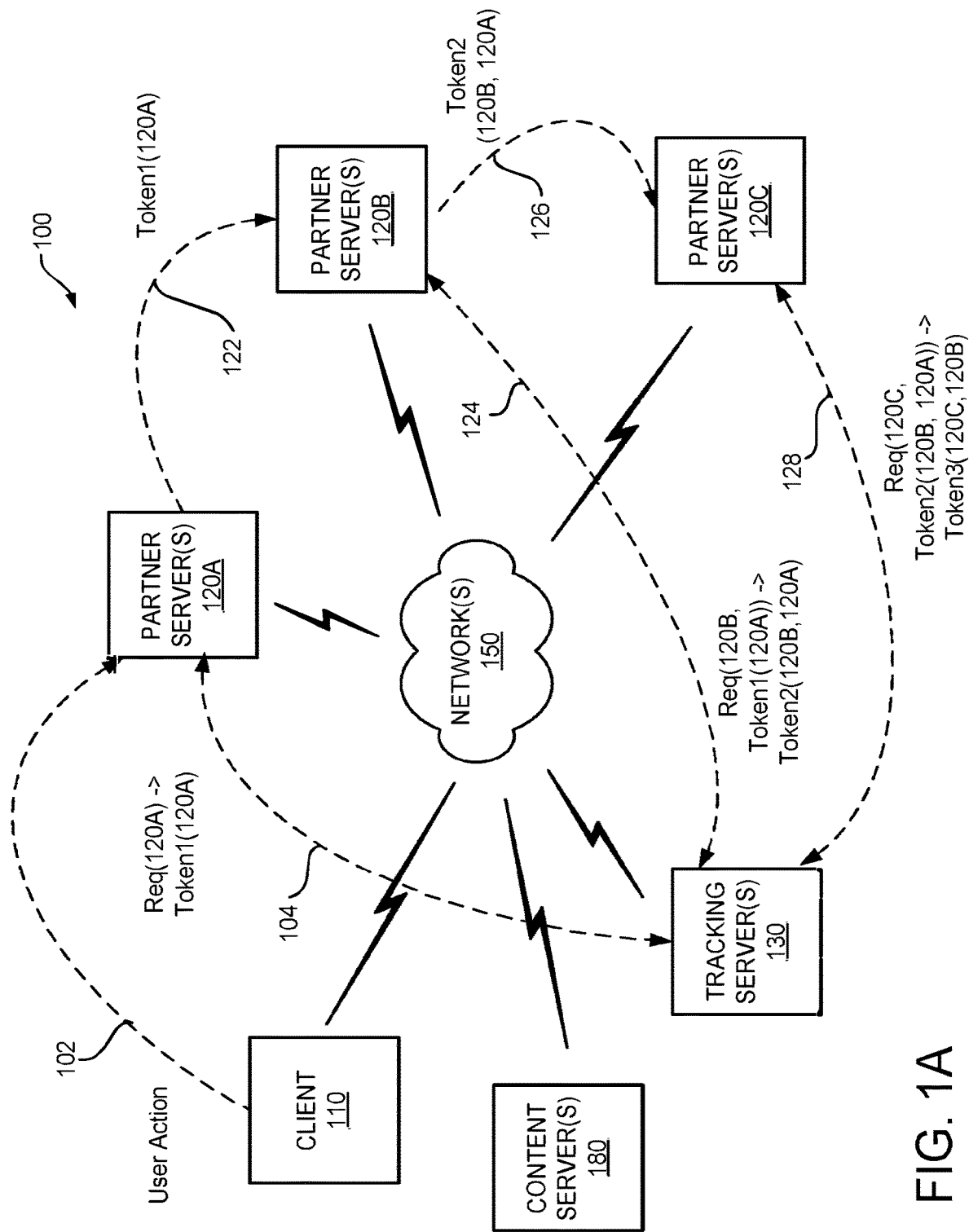
FIG. 1A is an architectural diagram showing an illustrative example of a multi-legged transaction in a system architecture.

The following Detailed Description describes technologies for tracking attributions across a complex chain of multiple redirects on a network with different partners in a multi-legged transaction.

Generally speaking, a content service, tracking service or API that issues tokens maintains an attribution stack with the association between tokens and individual partners participating in a network transaction and can identify the multiple attributions for the transaction despite the multiple legs of a chain of redirects/transactions. It is noteworthy that, as used herein, an attribution stack should be interpreted broadly as including any data structure suitable for collection of data. The attribution stack may include a stack, a list, a queue, a tree, a map, a collection, or any other data structure suitable for linking or collecting data.

Because the attribution stack can expand indefinitely to accommodate additional redirections, the disclosed technology offers a technical advantage of being able to track attribution in highly complex and lengthy network transaction strings. Further, because the attribution stack can be readily searched, it provides an efficient mechanism for determining attributions for a transaction.

Still further, a technical advantage includes reduction of network bandwidth usage and reduction of processor cycles required for attribution because an attribution stack data structure can be readily searched and because the information is accumulated as part of a web service call flow, and so additional network calls or processor calculations may be avoided in order to readily determine attribution. Other technical effects other than those mentioned herein can also be realized from implementation of the disclosed technologies.

One aspect of the disclosed technology is tracking tokens and maintaining an attribution stack involving the tracking tokens for attribution in N-legged network transactions. For example, a content servicer or tracking API entity can generate tracking tokens and maintain an attribution stack that associates the tracking tokens with attribution entities to track attributions across a network for a multi-legged transaction, which permits more than two entities to participate in a transaction and each entity still receive attribution for the transaction regardless of the length of a chain of redirects.

Another aspect of the disclosed technology involves generating composite tracking tokens to capture two parties to a redirection/transaction and persisting an attribution stack that tracks attribution across a chain of redirections/transactions. Each composite tracking token can identify up to two parties to a redirection. A content server that generates the composite tracking tokens can construct an attribution stack of partner redirects for a transaction to represent complex attributions for a chain of redirects.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for attribution tracking will be described. As will be described in more detail below with respect to the figures, there are a number of applications and services that may embody the functionality and techniques described herein.

As noted above, presently, a content service can have partner services that, in turn, can have their own partners who should receive attribution in a complex multi-legged content transaction. Conventional tracking tokens are widely used for specifying metadata for user network interactions, such as an advertising campaign. The metadata can be a campaign ID, a keyword or other placeholder. However, conventional tracking tokens cannot typically track attribution to partners across a chain of multiple partners relating to a multi-legged transaction.

Figure 1B:
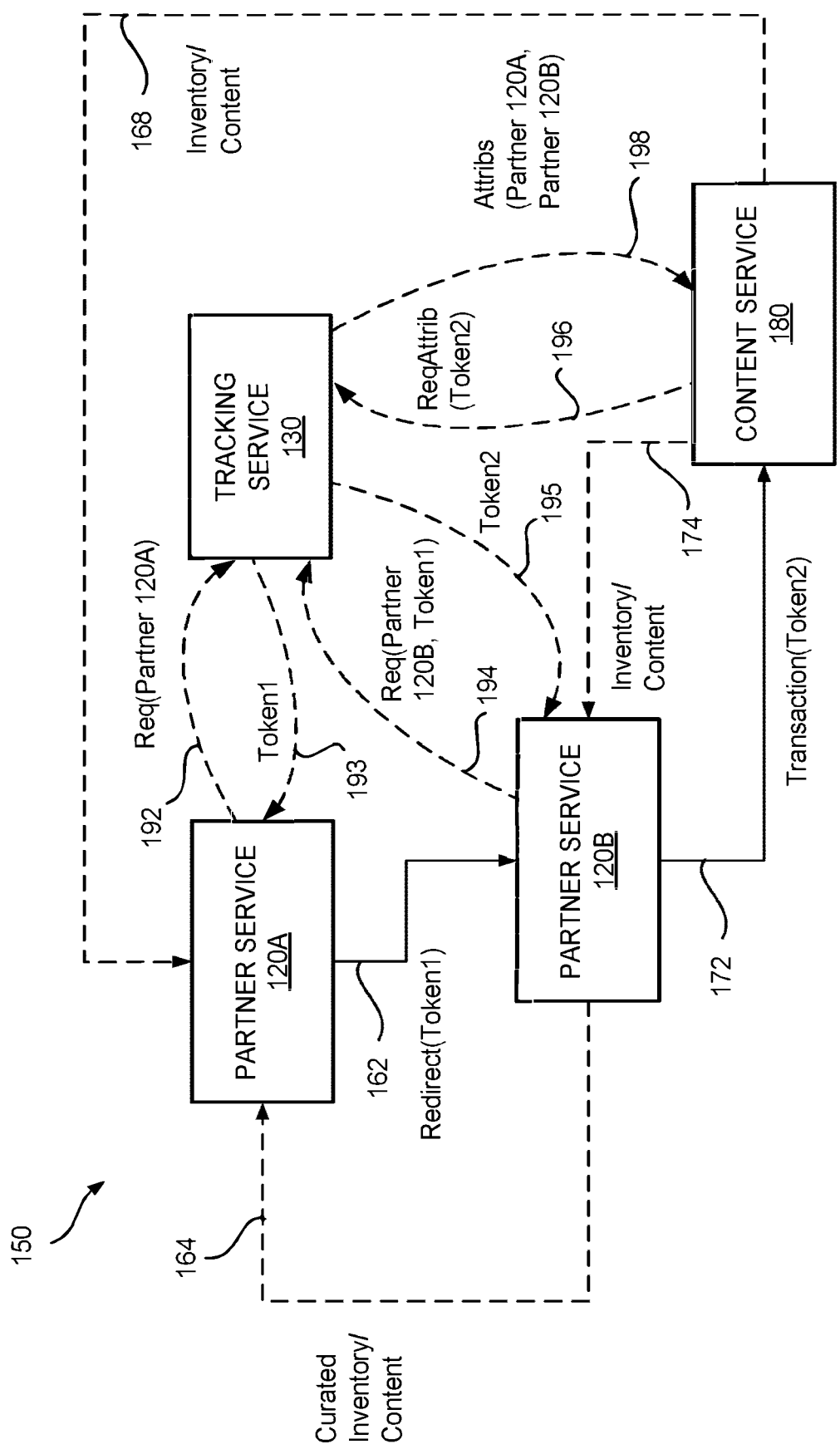
FIG. 1B is a data architecture diagram showing an illustrative example of data exchange in a multi-legged transaction.

For example, many of the advertisements in an online marketplace can be coming from a partner website that is tailored to millennials or a similar demographic group. When a user of the online marketplace clicks through an advertisement from the partner website, the navigation flow redirects to the partner website. When the user executes a transaction on the partner website, the transaction is handled by an API of the online marketplace service, e.g. a buy API, with the partner website being the transaction partner of record. Both the transaction and the NORB are attributed to the partner website even though the user originated on the online marketplace. However, both the online marketplace and the partner website are attributable for the network traffic from the user. FIGS. 1A and 1B illustrate the inventory and transaction flow for such an example.

FIG. 1A is an architectural diagram illustrating an example 100 of a series of redirects resulting in a transaction. A user of client 110 interacts with the user experiences of partner services 120A, 120B and 120C to access content, e.g. data, inventory or services, on content server 180. For purposes of clarity, the example of FIG. 1A is simplified to focus on the series of redirections and omits interactions with client 110 subsequent to an initial user action 102 and content flows from content server 180 to partner services 120A, 120B and 120C.

In FIG. 1A, a user of client 110 initiates a user action 102 in an interface experience for partner service 120A is received that causes partner service 120A to redirect the user, at 122, to the interface experience of partner servicer 120B. For example, a user may click on a link or advertisement in the interface experience of partner service 120A that redirects to the interface experience of partner service 120B. Partner service 120B responds to the user action with its interface experience presented to the user via client 110.

The user subsequently initiates an action through the interface experience of partner service 120B that redirects, at 124, to partner service 120C. Partner service 120C responds to the redirect with its interface experience presented to the user via client 110.

The user subsequently initiates a transaction request through the partner interface experience of partner service 120C that should be attributed to each entity involved in the chain of redirections leading up to the transaction request. The attribution for the transaction should be attributable to each of the partners involved in the transaction, e.g. partner services 120A, 120B and 120C. However, in a conventional system architecture, the only information available for attribution of the transaction pertains to the last partner in the chain of redirects, e.g. partner service 120C that receives the transaction request.

In the example of FIG. 1A, in accordance with the disclosed technology, a tracking server or service 130 interacts with the partner services in order to track attribution for a transaction through a series of redirections of indefinite length, i.e. there is no set limit on the number of partners in the series that can receive attribution for the transaction.

In this example, at 104, when a redirect occurs responsive to user action 102, partner service 120A requests and receives a first token Token1 from tracking service 130, e.g. Req(120A)→Token1(120A). The tracking service creates and maintains an attribution stack for the transaction in which partner service 120A is associated with tracking token Token1. Partner 120A includes Token1 in the redirection 122 to partner service 120B.

Partner service 120B, at 124, requests and receives a second tracking token Token2 from tracking service 130, e.g. Req(120B, Token1(120A))→Token2(120B,120A). The request from partner service 120B includes tracking Token1 received in redirect 122, which allows tracking service 130 to determine an attribution stack associated with the transaction. Tracking service 130 creates tracking Token2, which is associated with partner service 120B in the attribution stack for the transaction and logically links partner service 120B to partner service 120A in the attribution chain for the transaction.

Another redirection occurs at 126, e.g. due to a user action in the interface experience of partner service 120B. Partner service 120B includes tracking Token2 in the redirection 126 to partner service 120C. Partner service 120C, at 128, requests and receives a third tracking token Token3 from tracking service 130, e.g. Req(120C, Token2(120B, 120A))→Token3(120C,120B). The request from partner service 120B includes tracking Token2, which allows tracking service 130 to determine the attribution stack associated with the transaction and the relation of the redirection to previous redirections in the attribution chain for the transaction. Tracking service 130 creates tracking Token3, which is associated with partner service 120C in the attribution stack for the transaction and logically links partner service 120C to partner service 120B in the attribution stack and chain for the transaction.

Note that the requests for a tracking tokens, such as at 104, 124 and 126, can be initiated in several ways, such as when a redirect is received by a partner service or when a user action that causes an additional redirection is received through the interface experience of partner service 120B.

FIG. 1B illustrates a simplified example of redirect/ transaction flows 150 for a multi-legged network transaction that can be generated in the architecture example of FIG. 1A along with an attribution example. In the flow example, an interface experience of partner service 120A receives, at 168, inventory or content from the content service 180 that is presented to a user of client 110. The inventory or content can be curated or otherwise processed for presentation to a user, e.g. particular documents or products are selected by the partner service for presentation to the user.

In this example, the user makes a selection from the curated data in the interface experience of partner service 120A that results in a redirect 162 from partner service 120A to partner service 120B. Partner service 120A sends a request for tracking token, at 192, to tracking service 130, where the request is associated with partner service 120A. Tracking service 130 creates a first tracking Token1 and an attribution stack for the transaction chain and sends Token1 to partner service 120A, at 193. Partner service 120A includes Token1 in the redirect 162 to partner service 120B.

Partner service 120B also receives inventory or content from the content service 180, at 174, which it can curate and present to the user via the interface experience of partner service 120B. In this example, the user initiates a transaction, such as a download, information upload or purchase involving content from content server 180, at 172, with partner service 120B.

At 194, partner service 120B sends a request for tracking token to tracking service 130, where the request is associated with partner service 120B. Tracking service 130 uses Token1 received in redirect 162 to determine the attribution stack for the transaction. Tracking service 130 creates a second tracking token Token2 and associates Token2 with partner service 120B in the attribution stack for the transaction chain. At 195, tracking service 130 sends Token2 to partner service 120B. Partner service 120B includes Token2 in a transaction request 172 submitted to content service 180.

Because both partner service 120A and partner service 120B are involved in the chain of redirects resulting in the transaction, both should receive attribution for the transaction or user, e.g. NORB. When content service 180 receives the user initiated transaction request 172 with Token2, it sends an attribution request 196 to tracking service 130 that includes Token2. Tracking service 130 utilizes Token2 to identify the attribution stack for the transaction and extract the attributions for the transaction, e.g. partner services 120A and 120B. The attribution information for the transaction is returned to content service 180 at 198.

Note that the use of tracking tokens and an attribution stack in a tracking service, in accordance with the disclosed technology, enables a chain of redirects of indefinite length to be tracked for attribution of a transaction. Each redirect includes a tracking token for the entity performing the redirect that enables the attribution stack to be identified for further redirects.

Also note that the requests for tracking tokens to tracking service can occur at various points in processing. For example, a partner service can initiate a request for a tracking token from tracking service when it receives a redirect with a tracking token from a previous partner service in a chain of redirects. In another example, a partner service can initiate the request for a tracking token when a redirect is initiated in an interface experience of the partner service.

The disclosed technology provides for a tracking service to issue tracking tokens and maintain an attribution stack for a transaction. The attribution stack can accumulate the tokens and associated partners for a complex chain of multiple redirects with different partners in a multi-legged transaction. The chain of redirections can be of indefinite length. When a transaction occurs, the attribution information for the chain of redirections can be obtained for use in attributing the transaction.

In some examples, composite tracking tokens can be used to track attribution across a complex chain of multiple redirects with different partners in a multi-legged transaction. Each composite tracking token can identify up to two parties to a redirection. A tracking service or API associated with a content server generates the composite tracking tokens and constructs an attribution stack of partner redirects for a transaction to represent complex attributions for a chain of redirects.

One aspect of the disclosed technology is tracking tokens and maintaining an attribution stack involving the tracking tokens for attribution in N-legged network transactions. Another aspect of the disclosed technology is generating composite tracking tokens to capture two parties to a redirection/transaction and persisting an attribution stack that tracks attribution across a chain of redirections/transactions.

Conventional tracking tokens, such as tracking tokens used in advertising to specify an ad campaign and campaign metadata, typically include a campaign identifier, placeholder, keyword or similar identifier. By contrast, in the disclosed technology, composite tracking tokens can identify up to two entities involved in a redirection. By associating a composite tracking token with each redirection in an attribution stack, a chain of redirections can be tracked for attribution. The chain of redirections can be of indefinite length and still be tracked for attribution using the composite tracking tokens and attribution stack.

Figure 2A:
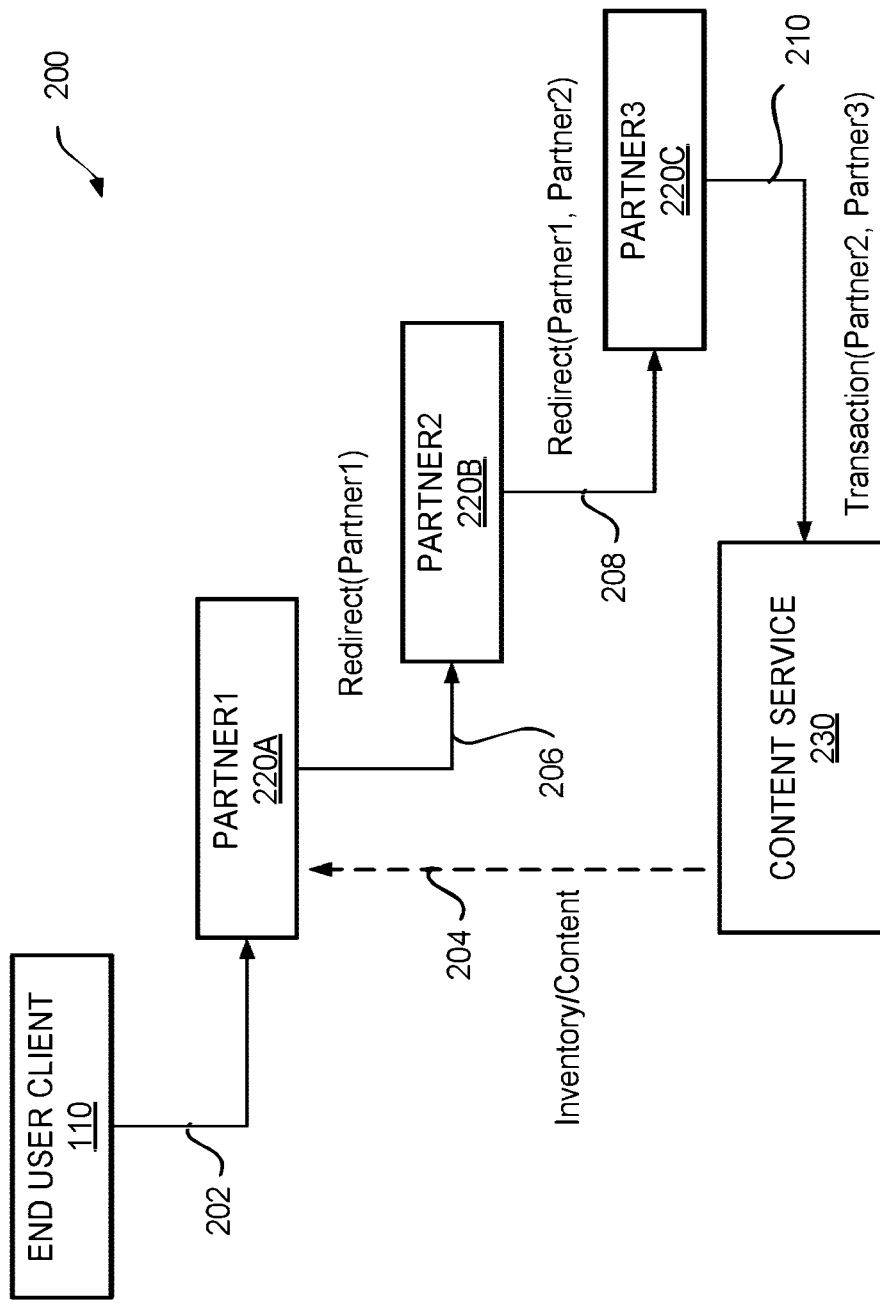
FIG. 2A is an architectural diagram showing an illustrative example of the disclosed technology for attribution tracking for multi-legged transactions using complex tracking tokens.

FIG. 2A is a data flow diagram illustrating another example of an attribution chain 200 associated with a multi-legged network transaction where three partner services 220A-C utilizing multiple composite tracking tokens in combination with an attribution stack in accordance with the disclosed technology that permits attribution to all the multiple parties in the complex chain of redirections/transactions of the flow.

In this example, an end user client 110 engages a first partner service Partner1 220A, which obtains inventory/content data 204 from content service 230. Partner1 220A redirects, at 206, the end user client 110 to a second partner service Partner2 220B with a first attribution or tracking token identifying Partner1 as the source of the redirect. Partner2 220B, in turn, redirects, at 208, to a third partner service Partner3 220C with a second composite attribution token identifying the redirection from Partner1 to Partner2. The third partner service Partner3 220C redirects a transaction, at 210, with the end user client 110 to the content service 230 with a third composite attribution token identifying redirection from Partner2 to Partner3. In this scenario, Partner1, Partner2 and Partner3 should each receive attribution for the transaction or NORB.

Note that a recent Internet Engineering Task Force (IETF) draft for OAuth 2.0 Token Exchange, https://tools.ietf.org/html/draft-ietf-oauth-token-exchange-16, proposed the use of composite authorization tokens for delegating authorization in an OAuth context by combining a pair of OAuth authorization tokens into a composite token. In this proposal, each composite token includes a subject token, e.g. a token for a subject entity that is buying an item or receiving sensitive data, and an actor token, e.g. a token for an actor entity, such as a payment provider or HIPPA compliant service, acting on behalf of the subject entity. The resulting composite token of the subject and actor tokens can be used by the actor entity to act on behalf of the subject entity.

Figure 2B:
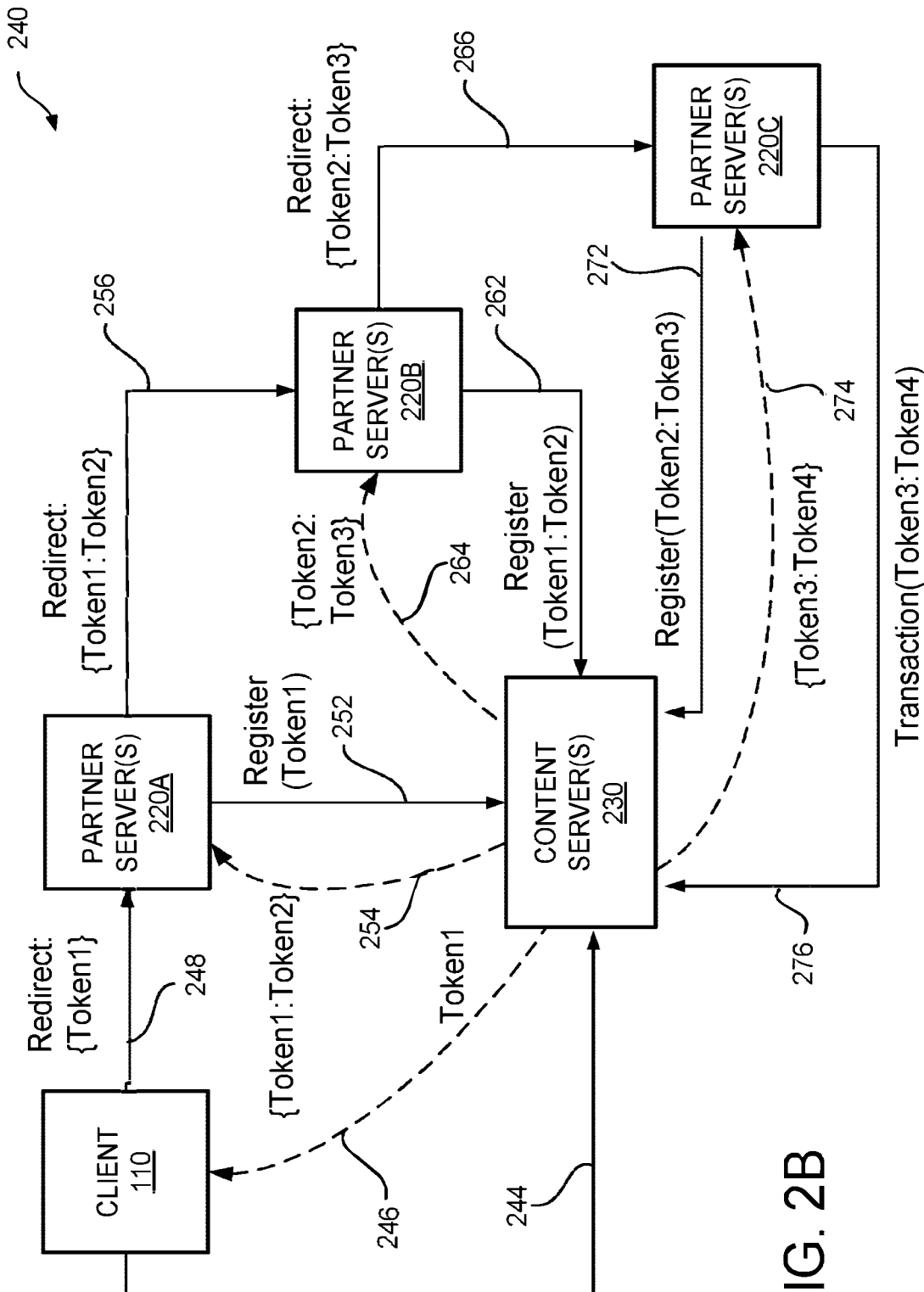
FIG. 2B is a data architecture diagram showing another illustrative example of data exchange in an application of the disclosed technology for attribution tracking for multi-legged transactions using complex tracking tokens.
Figure 2C:
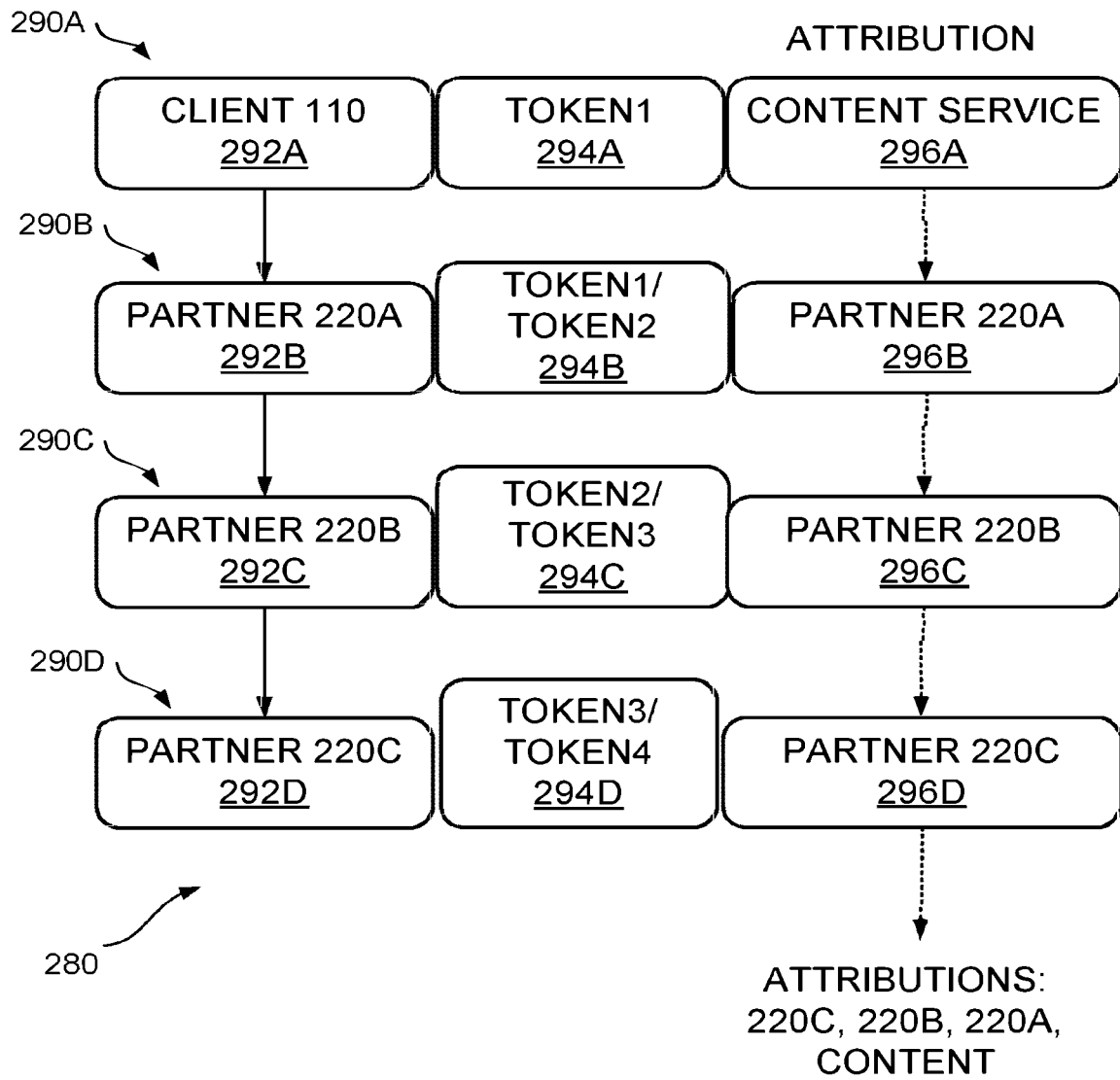
FIG. 2C is a message diagram illustrating yet another illustrative example of message and data exchange in an application of the disclosed technology for attribution tracking for multi-legged transactions using complex tracking tokens.

In contrast, the tracking tokens or composite tracking tokens in the aspect of the disclosed technology illustrated in FIGS. 2B and 2C involve tracking attribution for a network transaction rather than delegation of OAuth authorization. In one example of a composite tracking token in accordance with this aspect of the disclosed technology, a composite tracking token can be used to identify both entities involves in a redirection of a request or transaction. By creating an attribution stack that tracks each composite tracking token and the entities involved in a redirection/transaction, the attributions for the entities involved in a multi-legged transaction of indeterminate length can be determined.

FIG. 2B is a data architecture diagram illustrating an example of a network redirection/transaction flow scenario 240 utilizing multiple composite tracking tokens in accordance with the disclosed technology that permits attribution to multiple parties in a complex chain of network redirections/transactions of the flow.

In this example, a user of client 110 initiates an action with a tracking service API of content service 230, at 244, that results in a redirection of the client 110 to partner service 220A, at 248. Content service 230 or an affiliated attribution tracking service configured in accordance with the disclosed technology generates a first attribution token Token1, which is sent to client 110, at 246. When content server 230 generates the first attribution token Token1, it establishes an attribution stack for the transaction with client 110.

Client 110 includes the first attribution token Token1 in the redirection to partner service 220A, at 248. At 252, partner service 220A registers the first token Token 1 received in the redirection from client 110 that includes attribution token Token1 with content service 230. Content service 230 generates a second attribution token Token2 that is combined with the first token Token1 in a composite token {Token1; Token2} and adds the composite token {Token1; Token2} to the attribution stack for the transaction in association with partner service 220A. At 254, the composite tracking token {Token1:Token2} is provided to partner service 220A.

At 256, partner service 220A redirects the flow to partner service 220B and includes composite tracking token {Token1:Token2} in the redirection. At 262, partner service 220B registers the composite tracking token {Token1:Token2} received in the redirection from partner service 220A with content service 230. Content service 230 generates a third attribution token Token3, that is combined with the second token Token2 in a composite token {Token2; Token3} and adds the composite token {Token2; Token3} to the attribution stack for the transaction in association with partner service 220B. At 264, the composite tracking token {Token2; Token3} is provided to partner service 220B.

At 266, partner service 220B redirects the flow to partner service 220C and includes composite tracking token {Token2:Token3} in the redirect. At 272, partner service 220C registers {Token2:Token3} with content service 230. Content service 230 generates a fourth attribution token Token4, that is combined with the third token Token3 in a composite token {Token3; Token4} and adds the composite token {Token3; Token4} to the attribution stack for the transaction in association with partner service 220C. At 274, the composite tracking token {Token3; Token4} is provided to partner service 220C.

When the user of client 110 requests a transaction through partner service 220C, partner service 220C redirects the transaction to content service 230 and includes composite tracking token {Token3:Token4} in the redirected transaction. Based on the attribution stack, content service 230 is able to attribute the transaction to partner services 220A, 220B and 220C as well as itself.

FIG. 2C is a data architecture diagram that illustrates one example of an attribution stack 280 in accordance with the example of FIG. 2B. In first row 290A of the attribution stack 280, the client 110 is identified at 292A in association with the first attribution token Token1 at 294A and is attributed to content service 230 at 296A because content service 230 redirected client 110. In second row 290B of the attribution stack 280, partner service 220A is identified at 292B in association with composite attribution token {Token1; Token2} at 294B and is attributed to partner service 220A at 296B.

In third row 290C of the attribution stack 280, partner service 220B is identified at 292C in association with composite attribution token {Token2; Token3} at 294C and is attributed to partner service 220B at 296C. In fourth row 290D of the attribution stack 280, partner service 220C is identified at 292C in association with composite attribution token {Token2; Token3} at 294C and is attributed to partner service 220C at 296D.

Accumulating the attribution data 296 from attribution stack 280 permits the attributions from each leg of a multi-legged transaction flow to be determined. Note that continued redirections in addition to the redirections described in FIG. 2B can be added as an additional row 290 in attribution stack 280 so that an attribution chain can be of indefinite length.

In this aspect of the disclosed technology, an attribution chain can be formed using composite tokens issued by content server, tracking server or other entity that maintains the association between the composite attribution tokens and individual attribution tokens. The following is an illustrative example of a chain of attribution involving composite tracking tokens:

{Token 1}→{Token 1|Token 2}→{Token 2|Token 3}

The disclosed technology can permit a platform to allow an indefinite number of N actors to receive attribution in a network transaction on the platform.

Attribution using composite tracking tokens in accordance with the disclosed technology can take a variety of forms. As noted above, tracking tokens associated with a particular entity in a redirection/transaction chain and the tokens and associations for the chain can be maintained in an attribution stack to track the attributions for a multi-legged transaction.

Figure 3A:
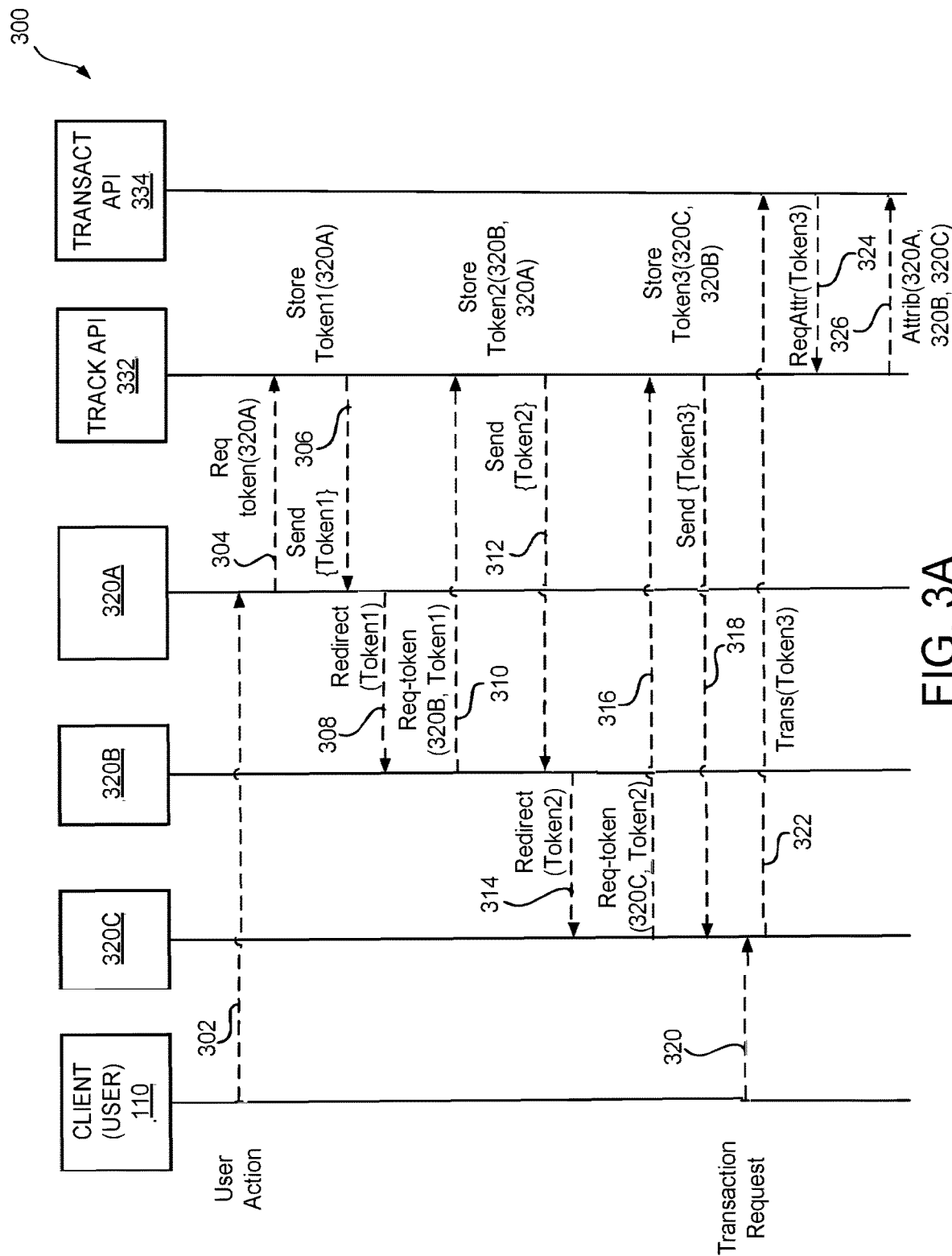
FIG. 3A is a data architecture diagram illustrating an example of an attribution stack showing complex attributions relationships between entities in the application of the disclosed technology for attribution tracking for multi-legged transactions using complex tracking tokens of FIG. 2A.

FIG. 3A is a message diagram illustrating an example of another scenario 300 for attribution in accordance with another aspect of the disclosed technology where tracking tokens are obtained from a tracking API 332 when a redirect takes place. In this example, a user of client 110 initiates a user action, at 302, with partner service 320A that results in a redirect to partner service 320B. At 304, partner service 320A requests an attribution tracking token from tracking API 332. API 332 generates a first tracking token Token1 and stores Token1 in an attribution stack in association with partner service 320A. At 306, API 332 provides Token1 to partner service 320A. Partner service 320A includes Token1 in a redirect to partner service 320B, at 308.

At 310, partner service 320B requests an attribution tracking token from tracking API 332. API 332 generates a second tracking token Token2 and stores Token2 in the attribution stack in association with partner service 320B. At 312, API 332 provides Token2 to partner service 320B. Partner service 320B includes Token2 in a redirect to partner service 320C, at 314.

At 316, partner service 320C requests an attribution tracking token from tracking API 332. API 332 generates a third tracking token Token3 and stores Token3 in the attribution stack in association with partner service 320C. At 318, API 332 provides Token3 to partner service 320B.

At 320, client 110 makes a transaction request to partner service 320C. In response, at 322, partner service 320C redirects the transaction request to transaction API 334 with the third tracking token Token3.

During processing of the transaction, transaction API 334 provides Token3 in an attribution request message 324 to tracking API 332. When tracking API 332 receives the attribution request message that includes Token3, it obtains the attributions for the transaction from the attribution stack for the transaction, e.g. the transaction is attributed to partner services 320A, 320B and 320C.

Figure 3B:
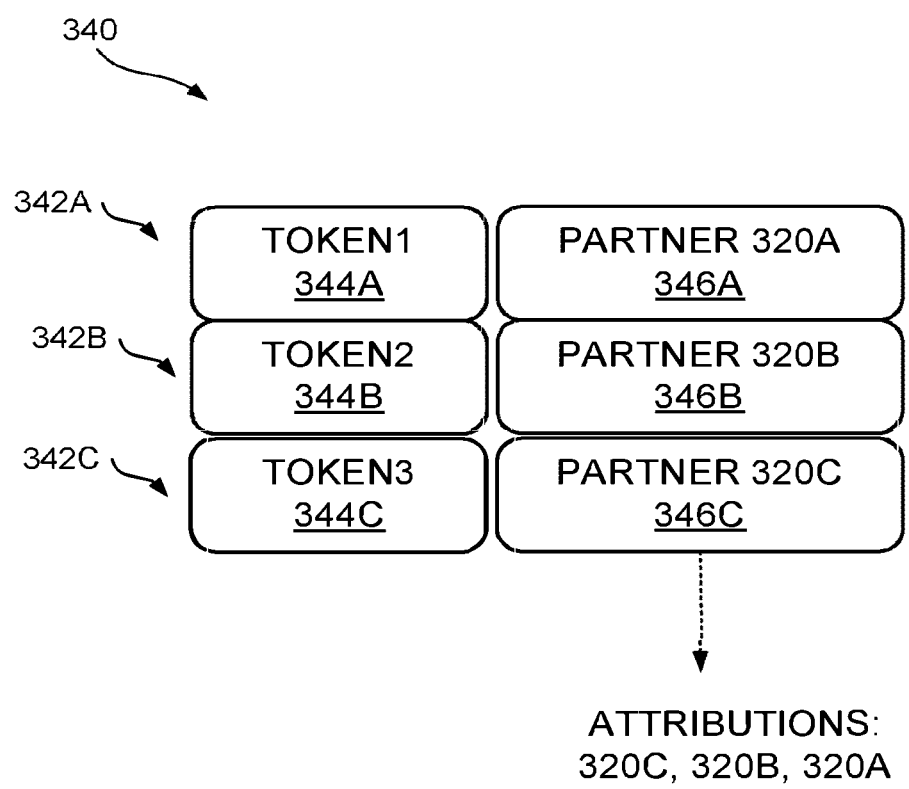
FIG. 3B is a data architecture diagram illustrating an example of an attribution stack showing complex attributions relationships between entities in the application of the disclosed technology for attribution tracking for multi-legged transactions using complex tracking tokens of FIG. 2C.

FIG. 3B is a data architecture diagram that illustrates one example of an attribution stack 340 in accordance with the example of FIG. 3A. Because Token3 is associated with partner service 320C at 346C in row 342C of attribution stack 340, partner service 320C is included in the attribution. Because Token2 is associated with partner service 320B at 346B in row 342B of attribution stack 340, partner service 320B is included in the attribution. Because Token1 is associated with partner service 320A at 346A in row 342A of attribution stack 340, partner service 320A is included in the attribution. Thus, the attributions for a transaction can be accumulated from an attribution stack for the transaction using tracking tokens in accordance with the disclosed technology.

As discussed above, the use of tracking tokens can be varied for different implementations without departing from the disclosed technology. For example, composite tracking tokens can be utilized that can associate a redirection from one entity to another, e.g. partner service 220A as actor entity and partner service 220B as subject entity for a composite tracking token representing redirection from partner service 220A to partner service 220B in FIG. 2B. In accordance with certain aspects of the disclosed technology, a composite tracking token can be a unique identifier that enables mapping between two parties involved in redirection/transaction for purposes of attribution. A chain may be formed using multiple composite tracking tokens.

In another example in accordance with another aspect of the disclosed technology, tracking tokens can be utilized that are associated with a single entity for attribution, e.g. partner service 320A. A complex network attribution scheme based on the tracking tokens can be maintained in an attribution stack maintained by an entity that provides the tracking tokens, e.g. tracking API 322 in FIG. 3A.

A content service, tracking service or API that issues tokens maintains an attribution stack with the association between tokens and individual partners participating in a transaction and can identify the multiple attributions for the transaction despite the multiple legs of a chain of redirects/transactions. The disclosed technology permits more than two entities to participate in a transaction and each receive attribution for the transaction regardless of the length of the chain of redirects.

These are simplified examples and many factors may be considered in a system or method for tracking attribution for a multi-legged transaction in accordance with the disclosed technology. Because the attribution stack can expand indefinitely to accommodate additional redirections, it offers a technical advantage of being able to track attribution in highly complex and lengthy transaction strings. Further, because the attribution stack can be readily searched, it provides an efficient mechanism for determining attributions for a transaction.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

Figure 4A:
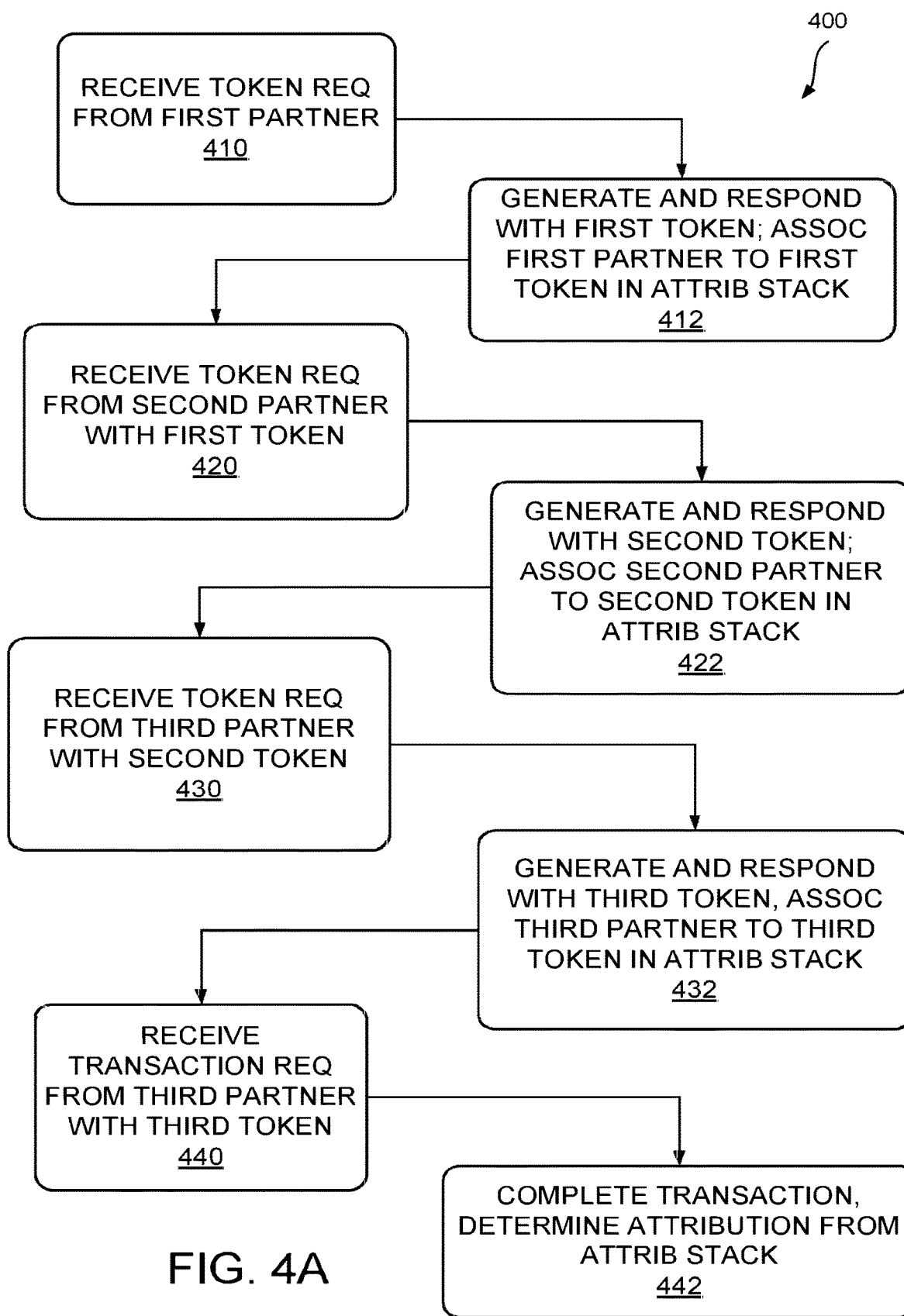
FIG. 4A is a control flow diagram showing an illustrative example of a process in a tracking service for attribution tracking for multi-legged transactions using tracking tokens in accordance with the disclosed technology.

FIG. 4A is a control flow diagram illustrating an example of a process 400 in a tracking server or service, such as tracking service 130 of FIG. 1B, content server 230 of FIG. 2B or tracking API 332 of FIG. 3A, configured to track attribution for a network transaction in accordance with the disclosed technology.

At 410, a token request is received in a tracking service from a first client. At 412, in this example, the tracking service generates and responds with a first tracking token with an attribution to the first partner for the transaction, such as tracking service 130 of FIG. 1B, content service 230 in FIG. 2B or tracking API 332 in FIG. 3A, and stores the first tracking token in association with the first partner in an attribution stack for the transaction, such as attribution stack 280 in FIG. 2C or attribution stack 340 in FIG. 3B.

At 420, a token request that includes the first token is received in the tracking service from a second partner. At 422, the tracking service generates and responds with a second tracking token with an attribution to the second partner for the transaction and stores the second tracking token in association with the second partner in the attribution stack for the transaction adjacent to the first tracking token entry in the attribution stack.

At 430, a token request that includes the second token is received in the tracking service from a third partner. At 432, the tracking service generates and responds with a third tracking token with an attribution to the third partner for the transaction and stores the third tracking token in association with the third partner in the attribution stack for the transaction adjacent to the second tracking token entry in the attribution stack.

At 440, a transaction request that includes the third token is received in the tracking service for completion of the transaction. At 442, the tracking service completes the transaction and determines the attribution for the transaction from the attribution stack for the transaction.

Note that the example of FIG. 4A is simplified to a three partner multi-legged transaction. The steps involving registration of a token with the tracking service can be repeated for an indefinite number of additional legs of a multi-legged transaction adding partners to the attribution stack until a transaction completes for the stack. Each additional leg results in the generation of an additional tracking token and an additional entry in the attribution stack for the transaction. Upon closing of the transaction, the attribution stack can be traversed to collect the attributions for each of the partners in the chain of the transaction.

Figure 4B:
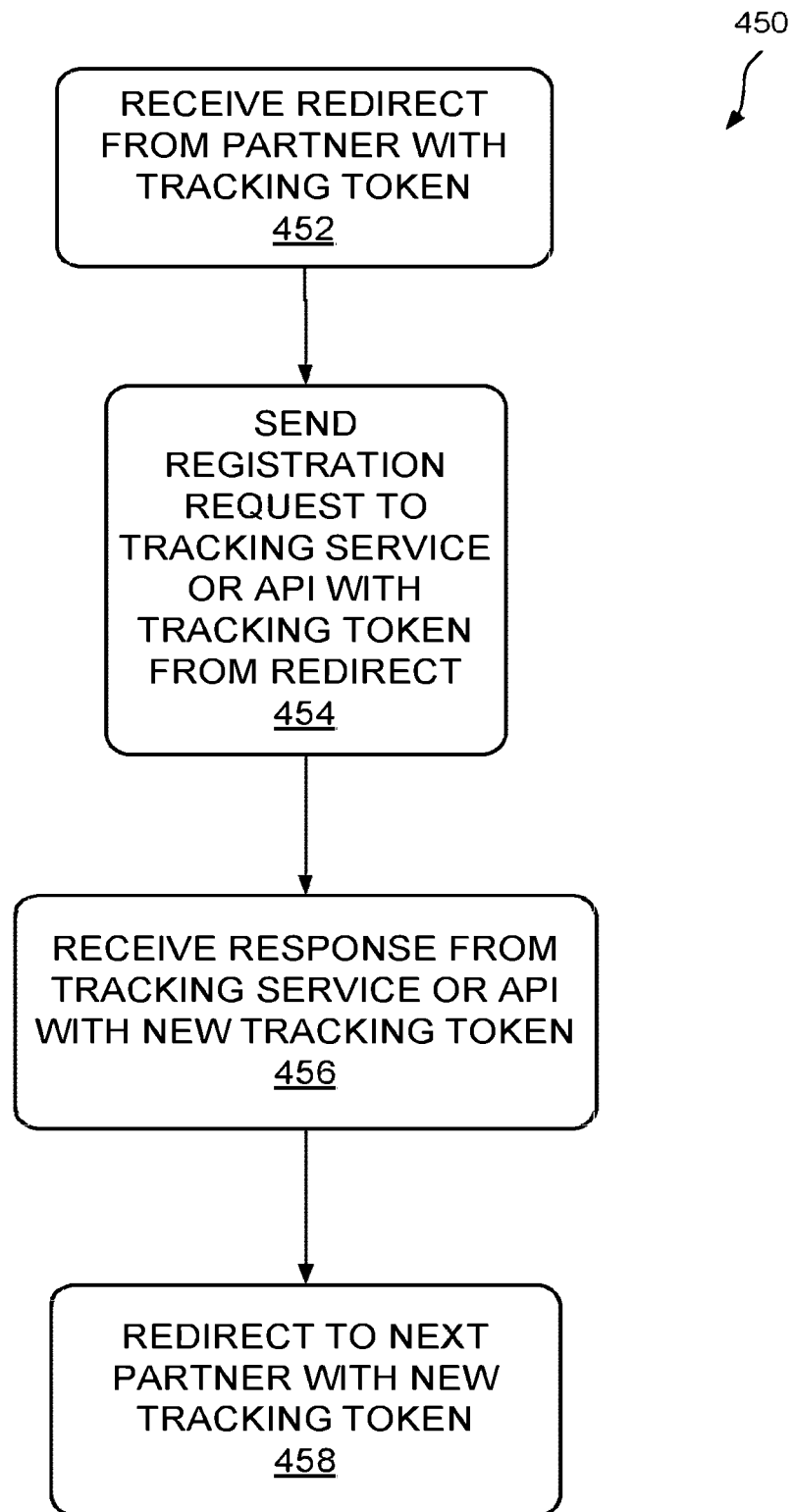
FIG. 4B is a control flow diagram showing an illustrative example of a process in a partner service for attribution tracking for multi-legged transactions using tracking tokens in accordance with the disclosed technology.

FIG. 4B is a control flow diagram illustrating an example of a partner service process 450 in a partner server or service, such as partner servers 220 or content server 230 or of FIG. 2B or partner servers 320 of FIG. 3A, configured to operate with a tracking service to facilitate network attribution tracking in accordance with the disclosed technology.

At 452, a partner service receives a redirect from a previous partner service in a transaction that includes a tracking token that is associated with the previous partner and recorded in an attribution stack for the transaction. At 454, the receiving partner service sends a token request or token registration request to the tracking service along with the tracking token received with the redirect from the previous partner.

At 456, the partner service receives a response from the tracking service that includes a new tracking token associated with the partner service and recorded in the attribution stack for the transaction. At 458, the partner service redirects to a next partner and includes the new tracking token with the redirect.

In these examples, the partner service process 450 operates in concert with the tracking service process 400 of FIG. 4A to track each redirection in a string of redirects in a transaction flow using tracking tokens and recording each redirection in the attribution stack. Other variations on these processes are possible in accordance with the disclosed technology.

Figure 4C:
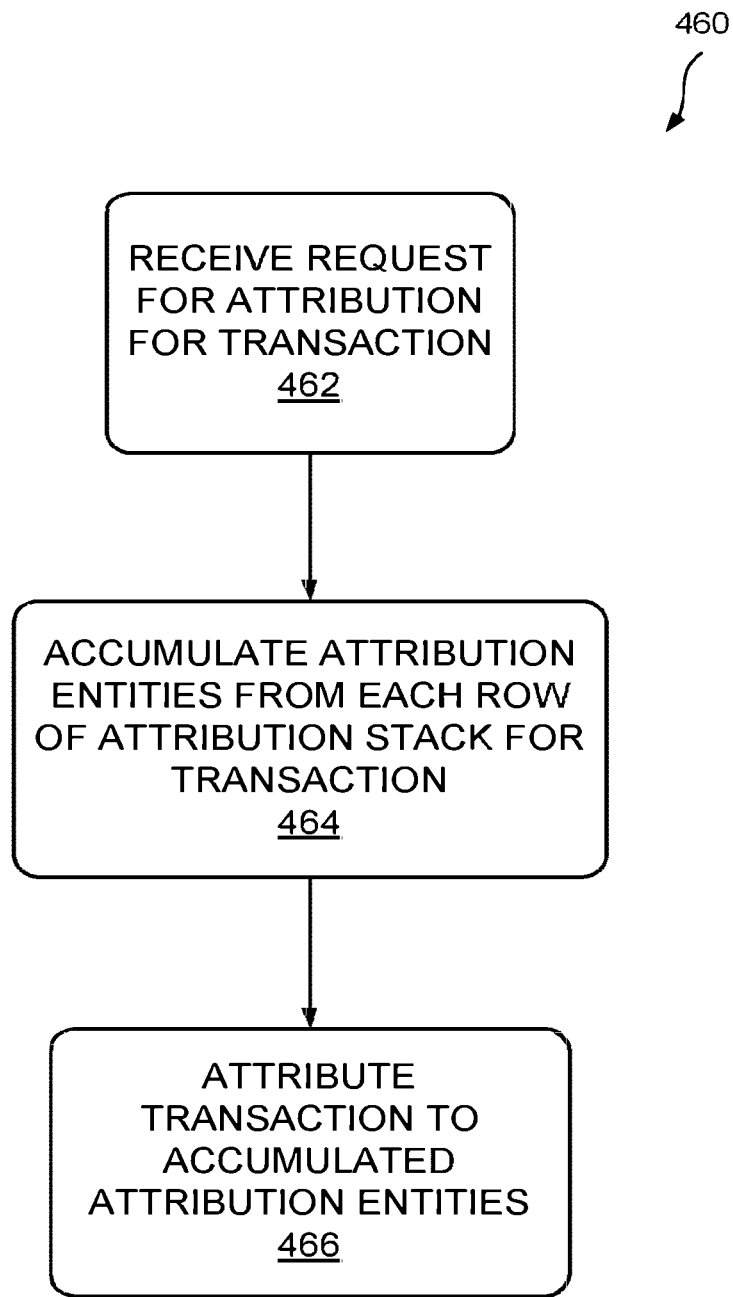
FIG. 4C is a control flow diagram showing an illustrative example of a process for determining attribution for multi-legged transactions using tracking tokens in accordance with the disclosed technology.

FIG. 4C is a control flow diagram illustrating an example of an attribution accumulation process 460 that can execute in a tracking service when a transaction closes to determine the attributions for the transaction. At 462, a request or triggering event is received for attribution for a transaction, such as completion of the transaction. At 464, the attribution entities from each entry in the attribution stack is accumulated for the transaction. At 466, the attribution or credit for the transaction is attributed to entities accumulated from the attribution stack. Attribution for a transaction is typically based on the terms of contracts or relationships between the partners in a transaction.

Figure 4D:
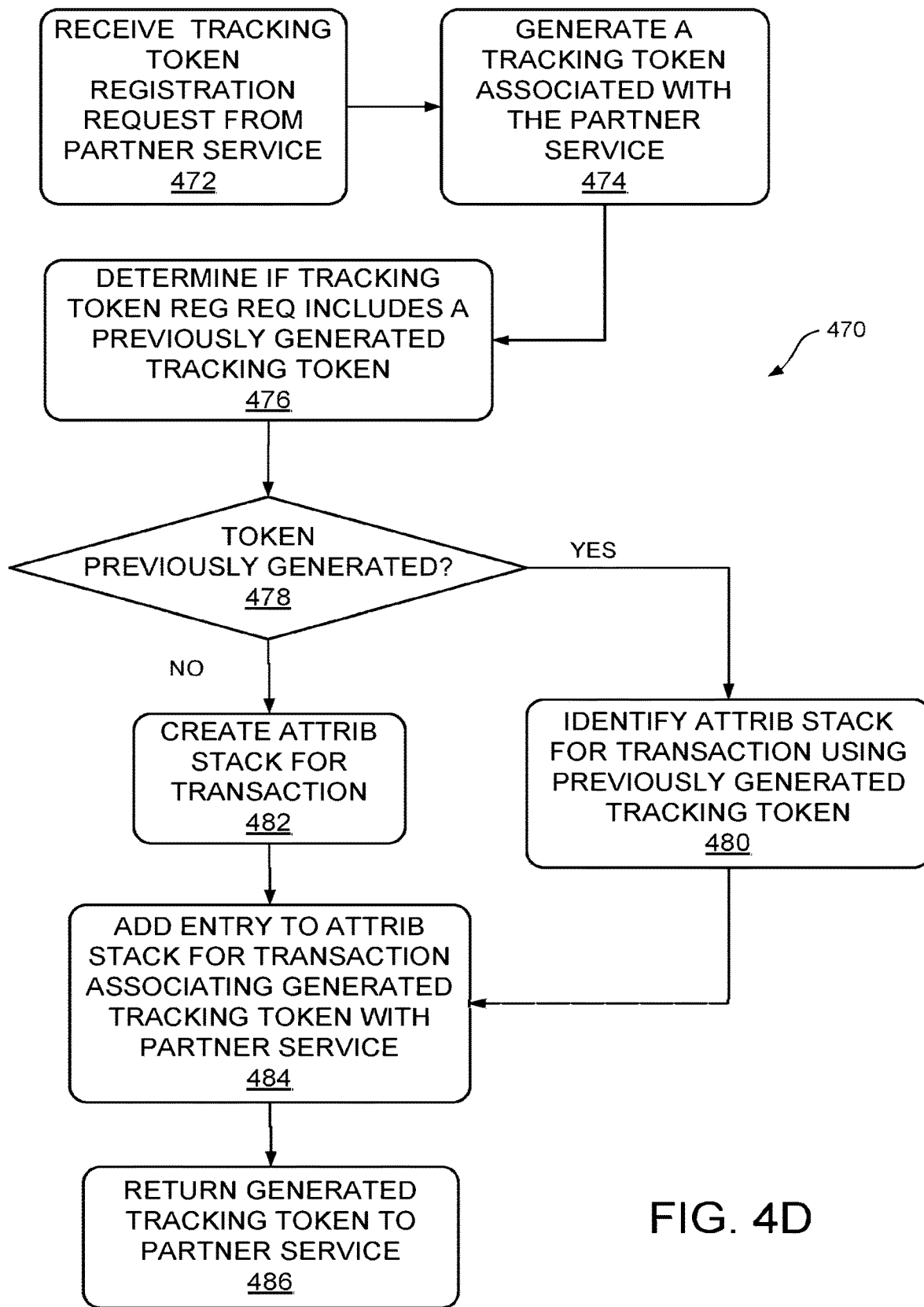
FIG. 4D is a control flow diagram showing another illustrative example of a process in a tracking service for attribution tracking for multi-legged transactions using tracking tokens in accordance with the disclosed technology.

FIG. 4D is a control flow diagram illustrating another example of a process 470 in a tracking server or service, such as tracking service 130 of FIG. 1B, content service 230 in FIG. 2B or tracking API 332 in FIG. 3A, configured to track network attribution in accordance with the disclosed technology.

At 472, a token registration request is received in a tracking service from a partner service. At 474, in this example, the tracking service generates a new tracking token that is associated with the partner service.

At 476, it is determined whether the received tracking token registration request includes a previously generated tracking token. If the token registration request does include a previously generated tracking token, then control branches at 478 to 480, where the previously generated tracking token is used to identify the attribution stack for the transaction. If no tracking token is present in the token registration request, then control branches to 482 to create an attribution stack for the transaction.

Control continues from 480 or 482 to 484, where an entry is added to the attribution stack for the transaction, where the entry associates the new tracking token generated at 474 with the partner service making the token registration request. At 486, the tracking service returns the new tracking token to the partner service in response to the token registration request.

It should be appreciated that a variety of different instrumentalities and methodologies can be utilized to establish wireless communication as well as collect, exchange and display sensor and message data without departing from the teachings of the disclosed technology. The disclosed technology provides a high degree of flexibility and variation in the configuration of implementations without departing from the teachings of the present disclosure.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach to attribution tracking. The specific examples of different aspects of attribution tracking described herein are illustrative and are not intended to limit the scope of the techniques shown.

Computer Architectures for Attribution Tracking

Figure 6:
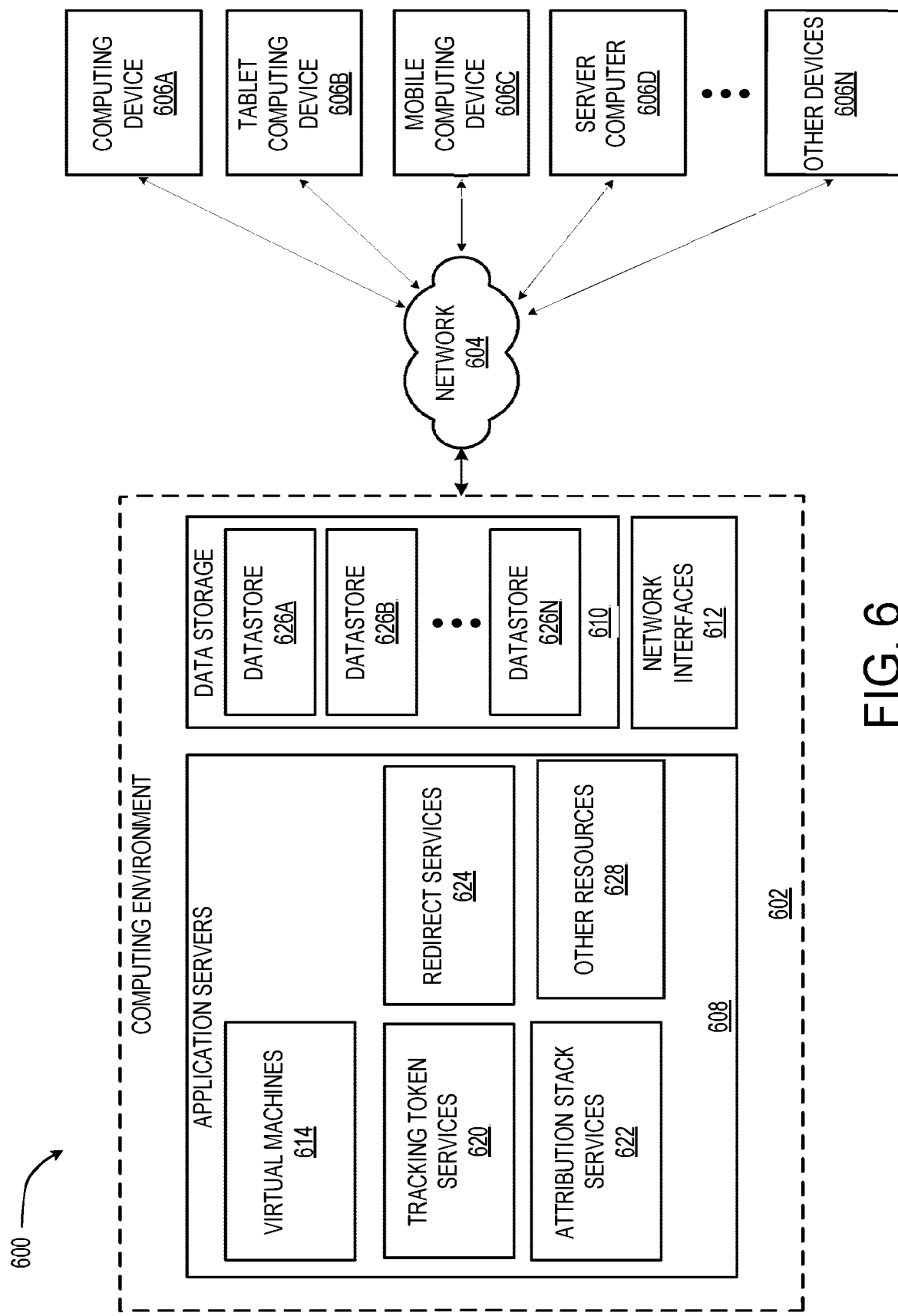
FIG. 6 is a diagram illustrating a distributed computing environment capable of implementing aspects of the techniques and technologies presented herein.

Note that at least parts of processes 400, 450, 460 and 470 of FIGS. 4A, 4B, 4C and 4D and other processes and operations pertaining to attribution tracking described herein may be implemented in one or more servers, such as computer environment 600 in FIG. 6, or the cloud, and data defining the results of user control input signals translated or interpreted as discussed herein may be communicated to a user device for display. Alternatively, the attribution tracking processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 450, 460 and 470 of FIGS. 4A, 4B, 4C, and 4D) are described herein as being implemented, at least in part, by an application, component, and/or circuit. Although the following illustration refers to the components of FIGS. 4A-D, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 450, 460 and 470 of FIGS. 4A, 4B, 4C, and 4D) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 5:
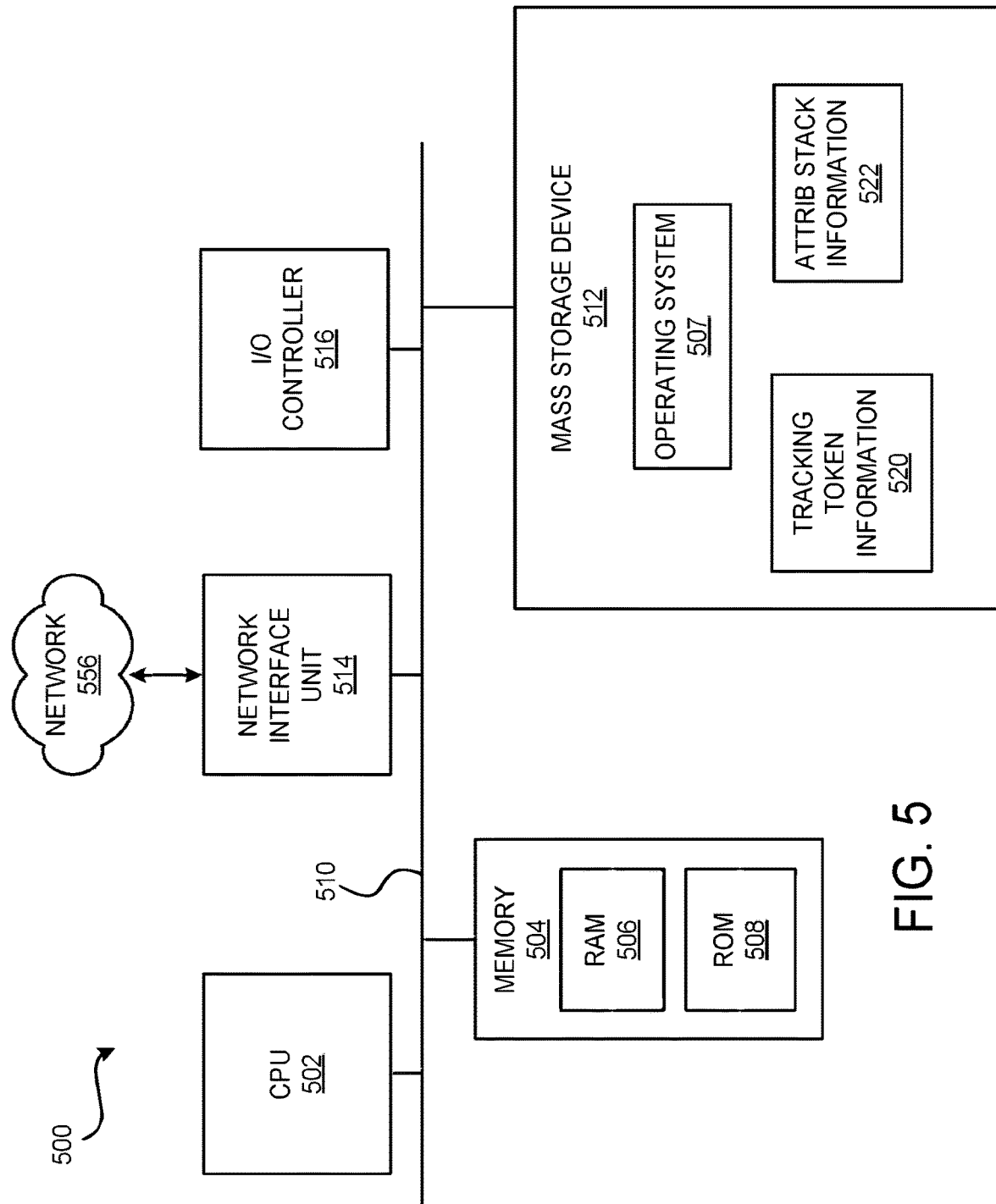
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the devices 110 and partner services 220 and content server 230 in FIG. 2B or partner services 320 and tracking API 332 in FIG. 3A, capable of executing the program components described herein. Thus, the computer architecture 500 illustrated in FIG. 5 illustrates an architecture for an on-board vehicle computer, a server computer, mobile phone, a PDA, a smart phone, a desktop computer, a netbook computer, a tablet computer, an on-board computer, a game console, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between sub-elements within the computer architecture 500, such as during startup, is stored in the ROM 508. The computer architecture 500 further includes a mass storage device 512 for storing an operating system 507, data (such as tracking token information 520 and attribute stack information 522), and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, game controller, television remote or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

FIG. 6 depicts an illustrative distributed computing environment 600 capable of executing the software components described herein for attribution tracking. Thus, the distributed computing environment 600 illustrated in FIG. 6 can be utilized to execute many aspects of the software components presented herein. For example, the distributed computing environment 600 can be utilized to execute one or more aspects of the software components described herein.

According to various implementations, the distributed computing environment 600 includes a computing environment 602 operating on, in communication with, or as part of the network 604. The network 604 may be or may include the network 556, described above. The network 604 also can include various access networks. One or more client devices 606A-806N (hereinafter referred to collectively and/or generically as "clients 606") can communicate with the computing environment 602 via the network 604 and/or other connections (not illustrated in FIG. 6). In one illustrated configuration, the clients 606 include a computing device 606A, such as a laptop computer, a desktop computer, or other computing device; a slate or tablet computing device ("tablet computing device") 606B; a mobile computing device 606C such as a mobile telephone, a smart phone, an on-board computer, or other mobile computing device; a server computer 606D; and/or other devices 606N, which can include a hardware security module. It should be understood that any number of devices 606 can communicate with the computing environment 602. Two example computing architectures for the devices 606 are illustrated and described herein with reference to FIGS. 5 and 7. It should be understood that the illustrated devices 606 and computing architectures illustrated and described herein are illustrative only and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for attribution tracking. It should be understood that this configuration is illustrative only and should not be construed as being limiting in any way.

According to various implementations, the application servers 608 also include one or more tracking token services 620, attribution stack services 622, and redirect services 624. The tracking token services 620 can include services for handling authentication requests and issuing tokens. The attribution stack services 622 can include services for maintaining an attribution stack for a transaction indicating the attribution tracking relationships between entities in the transaction. The redirect services 624 can include services for redirecting to partner services.

As shown in FIG. 6, the application servers 608 also can host other services, applications, portals, and/or other resources ("other resources") 628. The other resources 628 can include, but are not limited to, data encryption, data sharing, or any other functionality.

As mentioned above, the computing environment 602 can include data storage 610. According to various implementations, the functionality of the data storage 610 is provided by one or more databases or data stores operating on, or in communication with, the network 604. The functionality of the data storage 610 also can be provided by one or more server computers configured to host data for the computing environment 602. The data storage 610 can include, host, or provide one or more real or virtual data stores 626A-826N (hereinafter referred to collectively and/or generically as "datastores 626"). The datastores 626 are configured to host data used or created by the application servers 608 and/or other data. Aspects of the datastores 626 may be associated with services for attribution tracking. Although not illustrated in FIG. 6, the datastores 626 also can host or store web page documents, word documents, presentation documents, data structures, algorithms for execution by a recommendation engine, and/or other data utilized by any application program or another module.

The computing environment 602 can communicate with, or be accessed by, the network interfaces 612. The network interfaces 612 can include various types of network hardware and software for supporting communications between two or more computing devices including, but not limited to, mobile client vehicles, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 may provide the software functionality described herein as a service to the clients using devices 606. It should be understood that the devices 606 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 600 to utilize the functionality described herein for attribution tracking, among other aspects.

Figure 7:
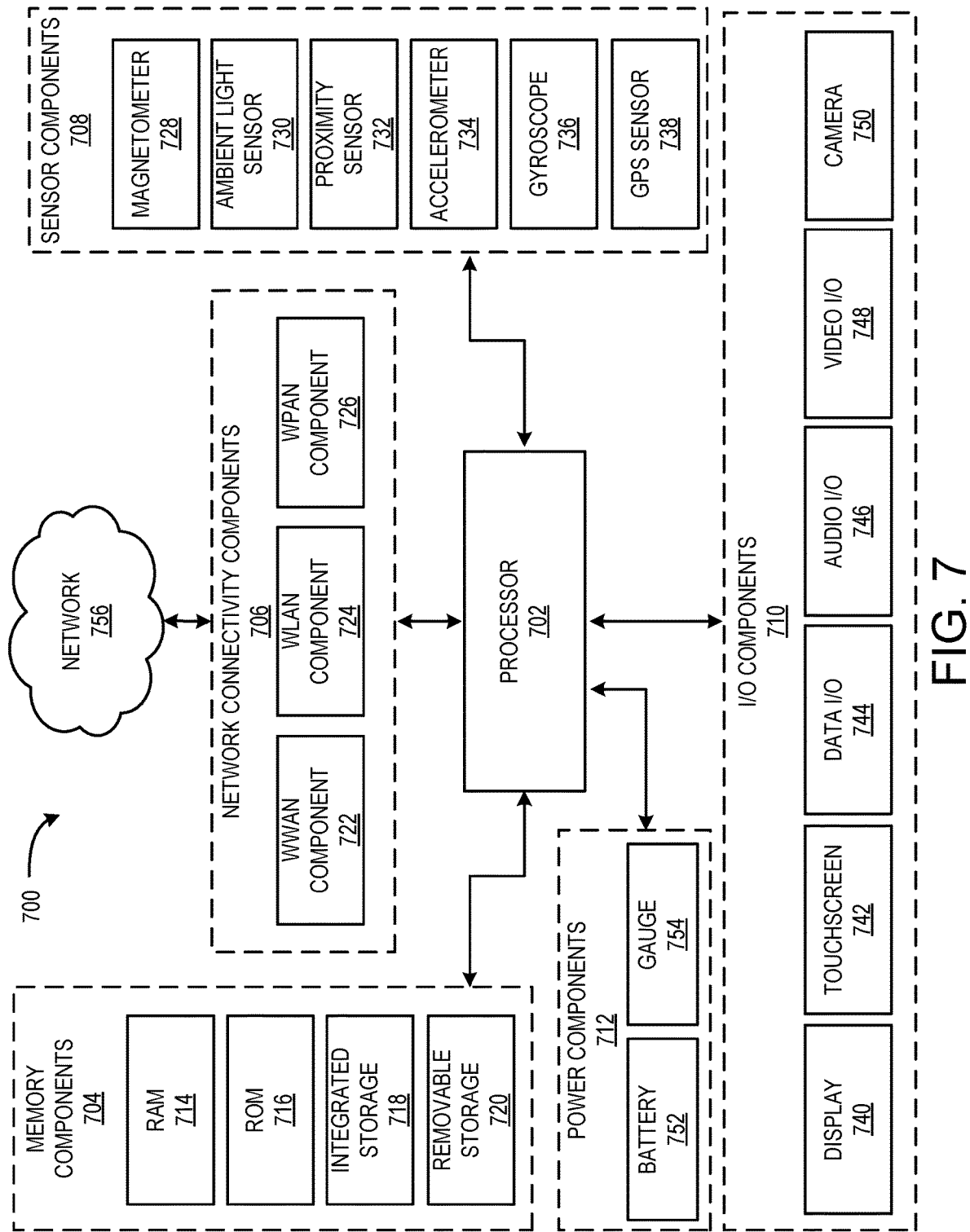
FIG. 7 is a computer architecture diagram illustrating a computing device architecture for a computing device capable of implementing aspects of the techniques and technologies presented herein.

Turning now to FIG. 7, an illustrative computing device architecture 700 for a computing device that is capable of executing various software components is described herein for attribution tracking. The computing device architecture 700 is applicable to computing devices such as mobile clients in vehicles. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 700 is applicable to the client device 110 and partner services 220 and content server 230 in FIG. 2B or partner services 320 and content server 330 in FIG. 3A and computing device 606A-N shown in FIG. 6.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, secure data.

In some configurations, the processor 702 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, California and others. In some configurations, the processor 702 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), mini SD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Washington or AWS from Amazon Corporation of Seattle, Washington. The operating system may also include WINDOWS MOBILE OS from Microsoft Corporation of Redmond, Washington, WINDOWS PHONE OS from Microsoft Corporation, WINDOWS from Microsoft Corporation, MAC OS or IOS from Apple Inc. of Cupertino, California, and ANDROID OS from Google Inc. of Mountain View, California. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 756 of FIG. 7. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UNITS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or be adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 602.11 standards, such as IEEE 602.11a, 602.11b, 602.11g, 602.11n, and/or future 602.11 standard (referred to herein collectively as WI-FI). Draft 602.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interfaces described below or may include processing functionality built-in to the processor 702.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The power components 712 may also include a power connector, which may be combined with one or more of the aforementioned I/O components 710. The power components 712 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1. A computer-implemented network attribution tracking method for multi-legged transactions, the method comprising: receiving a first token request from a first partner service; in response to the first token request: generating a first tracking token, associating the first tracking token to the first partner service in an attribution stack, and sending a response to the first token request that includes the first tracking token; receiving a second token request from the first partner service to a second partner service, the second redirection including the first tracking token; in response to the second token request: generating a second tracking token, associating the second tracking token to the second partner service in the attribution stack, and sending a response to the second redirection that includes the second tracking token; attributing a transaction to the first and second partner services based on the attribution stack.

Clause 2. The method of Clause 1, where the transaction comprises one of a data transaction and a purchase transaction.

Clause 3. The method of Clause 1, the method further comprising: receiving a redirection from a client; responsive to the redirection, sending the first token request to a tracking service; receiving a response from the tracking service with the first tracking token; and redirecting to the second partner with the first tracking token.

Clause 4. The method of Clause 3, the method further comprising: receiving a redirection from the first partner with the first tracking token; responsive to the redirection from the first partner, sending the second token request to the tracking service with the first tracking token; receiving a response from the tracking service with the second tracking token; and redirecting to a third partner with the second tracking token.

Clause 5. The method of Clause 4, the method further comprising: receiving a redirection from the second partner with the second tracking token; responsive to the redirection from the first partner, sending the second token request to the tracking service with the second tracking token; receiving a response from the tracking service with a third tracking token; and responsive to a transaction request from the client, sending one of a transaction request and an attribution request to the tracking service with the third tracking token.

Clause 6. The method of Clause 1, where the step of attributing the transaction to the first, second and third partner services based on the attribution stack comprises: receiving a request for attribution for the transaction; accumulating attribution entities from each entry of attribution stack for the transaction; and attributing the transaction to the accumulated attribution entities.

Clause 7. The method of Clause 1, where: the first tracking token comprises a first composite tracking token that identifies the first partner; the second tracking token comprises a second composite tracking token that identifies the first partner and the second partner; and the third tracking token comprises a third composite tracking token that identifies the second partner and a third partner.

Clause 8. A system for network attribution tracking, the system comprising: one or more processors; and one or more memory devices in communication with the one or more processors, the memory devices having computer-readable instructions stored thereupon that, when executed by the processors, cause the processors to perform a network attribution tracking method for multi-legged transactions, the method comprising: receiving a tracking token registration request from a partner service; generating a tracking token associated with the partner service; adding an entry to an attribution stack for a transaction, where the entry associates the tracking token with the partner service; and returning the tracking token to the partner service.

Clause 9. The system of Clause 8, where: the step of receiving a tracking token request from a partner service includes: determining whether the tracking token request includes a previously generated tracking token; using the previously generated tracking token to identify the attribution stack for the transaction; and the step of adding an entry to an attribution stack for a transaction includes: adding the entry to the attribution stack identified for the transaction.

Clause 10. The system of Clause 9, where the step of generating a tracking token associated with the partner service includes: combining the previously generated tracking token in the generated tracking token to create a composite tracking token.

Clause 11. The system of Clause 9, where the step of adding an entry to an attribution stack for a transaction includes adding the entry to the attribution stack in an order corresponding to when the token registration request for the entry is received.

Clause 12. The system of Clause 9, where the method includes: receiving an attribution request for the transaction, where the attribution request includes a tracking token; identifying an attribution stack for the transaction using the tracking token included in the attribution request; accumulating attribution entities from each entry in the attribution stack identified for the transaction; and attributing the transaction to the accumulated attribution entities.

Clause 13. The system of Clause 12, where the method includes: sending an attribution request for the transaction when the transaction is completed.

Clause 14. The system of Clause 8, where the method includes: receiving a redirection from a previous partner service with the previously generated tracking token; sending the registration request to the tracking service with the previously generated tracking token; receiving a response from the tracking service with the tracking token associated with the partner service the received the redirection; and responsive to a redirection request to a next partner service, redirecting to the next partner service and including the tracking token received from the tracking service.

Clause 15. One or more computer storage media having computer executable instructions stored thereon which, when executed by one or more processors, cause the processors to execute a method for determining attribution for a transaction, the method comprising: attribution tracking method for multi-legged network transactions, the method comprising: receiving a tracking token registration request from a partner service; generating a tracking token associated with the partner service; adding an entry to an attribution stack for a transaction, where the entry associates the tracking token with the partner service; and returning the tracking token to the partner service.

Clause 16. The computer storage media of Clause 15, where: the step of receiving a tracking token request from a partner service includes: determining whether the tracking token request includes a previously generated tracking token; using the previously generated tracking token to identify the attribution stack for the transaction; and the step of adding an entry to an attribution stack for a transaction includes: adding the entry to the attribution stack identified for the transaction.

Clause 17. The computer storage media of Clause 16, where the step of generating a tracking token associated with the partner service includes: combining the previously generated tracking token in the generated tracking token to create a composite tracking token.

Clause 18. The computer storage media of Clause 16, where the step of adding an entry to an attribution stack for a transaction includes adding the entry to the attribution stack in an order corresponding to when the token registration request for the entry is received.

Clause 19. The computer storage media of Clause 16, where the method includes: receiving an attribution request for the transaction, where the attribution request includes a tracking token; identifying an attribution stack for the transaction using the tracking token included in the attribution request; accumulating attribution entities from each entry in the attribution stack identified for the transaction; and attributing the transaction to the accumulated attribution entities.

Clause 20. The system of Clause 15, where the method includes: receiving a redirection from a previous partner service with the previously generated tracking token; sending the registration request to the tracking service with the previously generated tracking token; receiving a response from the tracking service with the tracking token associated with the partner service the received the redirection; and responsive to a redirection request to a next partner service, redirecting to the next partner service and including the tracking token received from the tracking service.

What is claimed is:

1. A computer-implemented method comprising:
receiving, at a second service, a request from a client device via a first redirect including a first attribution tracking token associated with a first service;
sending, to a tracking token service, a token request including the first attribution tracking token, wherein the token request causes the tracking token service to associate a second attribution tracking token with the first attribution tracking token;
receiving, from the tracking token service, a token response including the second attribution tracking token; and providing, to the client device, a second redirect to a third service, the second redirect including the second attribution tracking token.

2. The computer-implemented method of claim 1, wherein the first attribution tracking token was received by the first service from the tracking token service, and wherein the first service provided the first redirect including the first attribution tracking token to the user device in response to receiving the first attribution tracking token from the tracking token service.

3. The computer-implemented method of claim 1, wherein the second service sends the token request to the tracking token service in response to the request from the client device including the first attribution tracking token.

4. The computer-implemented method of claim 1, wherein the tracking token service associates the second attribution tracking token with the first attribution tracking token by associating the first attribution tracking token with the first partner service in an attribution stack and associating the second attribution tracking token with the second partner service in the attribution stack.

5. The computer-implemented method of claim 4, wherein the tracking token service identifies the attribution stack using the first attribution tracking token.

6. The computer-implemented method of claim 1, wherein providing, to the client device, the second redirect to the third service comprises providing an interface to the client device that includes a link comprising the second redirect.

7. The computer-implemented method of claim 1, wherein the second redirect to the third partner service causes the client device to send a request to the third service that includes the second attribution tracking token.

8. The computer-implemented method of claim 7, wherein the request to the third service causes the third service to send, to the tracking token service, a second token request including the second attribution tracking token, wherein the second token request causes the tracking token service to associate a third attribution tracking token with the second attribution tracking token and provide a second token response to the third service that includes the third attribution tracking token.

9. One or more computer storage media storing computer-useable instructions that, when used by one or more computing devices, cause the one or more computing devices to perform operations, the operations comprising:
receiving, at a second service, a request from a client device via a first redirect including a first attribution tracking token associated with a first service;
sending, to a tracking token service, a token request including the first attribution tracking token, wherein the token request causes the tracking token service to associate a second attribution tracking token with the first attribution tracking token;
receiving, from the tracking token service, a token response including the second attribution tracking token; and
providing, to the client device, a second redirect to a third service, the second redirect including the second attribution tracking token.

10. The one or more computer storage media of claim 9, wherein the first attribution tracking token was received by the first service from the tracking token service, and wherein the first service provided the first redirect including the first attribution tracking token to the user device in response to receiving the first attribution tracking token from the tracking token service.

11. The one or more computer storage media of claim 9, wherein the second service sends the token request to the tracking token service in response to the request from the client device including the first attribution tracking token.

12. The one or more computer storage media of claim 9, wherein the tracking token service associates the second attribution tracking token with the first attribution tracking token by associating the first attribution tracking token with the first partner service in an attribution stack and associating the second attribution tracking token with the second partner service in the attribution stack; and wherein the tracking token service identifies the attribution stack using the first attribution tracking token.

13. The one or more computer storage media of claim 9, wherein providing, to the client device, the second redirect to the third service comprises providing an interface to the client device that includes a link comprising the second redirect.

14. The one or more computer storage media of claim 9, wherein the second redirect to the third partner service causes the client device to send a request to the third service that includes the second attribution tracking token; and wherein the request to the third service causes the third service to send, to the tracking token service, a second token request including the second attribution tracking token, wherein the second token request causes the tracking token service to associate a third attribution tracking token with the second attribution tracking token and provide a second token response to the third service that includes the third attribution tracking token.

15. A computer system comprising:
a processor; and
a computer storage medium storing computer-useable instructions that, when used by the processor, causes the computer system to perform operations comprising:
receiving, at a second service, a request from a client device via a first redirect including a first attribution tracking token associated with a first service;
sending, to a tracking token service, a token request including the first attribution tracking token, wherein the token request causes the tracking token service to associate a second attribution tracking token with the first attribution tracking token;
receiving, from the tracking token service, a token response including the second attribution tracking token; and
providing, to the client device, a second redirect to a third service, the second redirect including the second attribution tracking token.

16. The computer system of claim 15, wherein the first attribution tracking token was received by the first service from the tracking token service, and wherein the first service provided the first redirect including the first attribution tracking token to the user device in response to receiving the first attribution tracking token from the tracking token service.

17. The computer system of claim 15, wherein the second service sends the token request to the tracking token service in response to the request from the client device including the first attribution tracking token.

18. The computer system of claim 15, wherein the tracking token service associates the second attribution tracking token with the first attribution tracking token by associating the first attribution tracking token with the first partner service in an attribution stack and associating the second attribution tracking token with the second partner service in the attribution stack; and wherein the tracking token service identifies the attribution stack using the first attribution tracking token.

19. The computer system of claim 15, wherein providing, to the client device, the second redirect to the third service comprises providing an interface to the client device that includes a link comprising the second redirect.

20. The computer system of claim 15, wherein the second redirect to the third partner service causes the client device to send a request to the third service that includes the second attribution tracking token; and wherein the request to the third service causes the third service to send, to the tracking token service, a second token request including the second attribution tracking token, wherein the second token request causes the tracking token service to associate a third attribution tracking token with the second attribution tracking token and provide a second token response to the third service that includes the third attribution tracking token.

* * * * *